US012783974B1

(12) United States Patent
LaValley et al.

(10) Patent No.: US 12,783,974 B1
(45) Date of Patent: Nov. 3, 2026

(54) ASSEMBLING TAILORED EMERGENCY RESPONSE SOLUTIONS WITH AI-DRIVEN MODULAR ARCHITECTURE PLANE

(71) Applicant: RAPIDSOS, INC., New York, NY (US)

(72) Inventors: Zachery LaValley, Arlington, MA (US); Martin Vejmelka, Prague (CZ); Edwin Bennett Johnson, Melrose, MA (US); Chris Moscardini, Amesbury, MA (US); James Patrick Olejar, Jr., Fort Lauderdale, FL (US); Lam Nguyen, Cambridge, MA (US); Gabriel Mahoney, Stoneham, MA (US); Lisa deBettencourt, Westford, MA (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 19/433,768

(22) Filed: Dec. 27, 2025

(51) Int. Cl.
*G06Q 10/0631* (2023.01)

(52) U.S. Cl.
CPC .............................. *G06Q 10/06311* (2013.01)

(58) Field of Classification Search
CPC ................................................ G06Q 10/06311
USPC ................................. 717/101–103, 120–121
See application file for complete search history.

(56) References Cited

U.S. PATENT DOCUMENTS

| | | | | |
|---|---|---|---|---|
| 8,576,066 | B2 * | 11/2013 | Bivens | G08B 25/003 455/404.1 |
| 11,889,398 | B2 * | 1/2024 | Rohde | H04M 3/5116 |
| 12,301,756 | B1 * | 5/2025 | Olejar, Jr. | H04M 11/04 |
| 2017/0243146 | A1 * | 8/2017 | Aerdts | G06Q 10/06313 |
| 2024/0185191 | A1 * | 6/2024 | Bernardi | G06Q 20/02 |

OTHER PUBLICATIONS

Ortjohann et al., "Modular Architecture for Decentralized Hybrid Power Systems", 2008, IEEE, pp. 2134-2141. (Year: 2008).*
Hassoon et al., "Enabling the Integration of Health-Emergency Alert with privacy of Patients' location based services", 2019, IEEE, 5 pages. (Year: 2019).*
(Continued)

*Primary Examiner* — Ted T. Vo
(74) *Attorney, Agent, or Firm* — Michael L. Ross

(57) ABSTRACT

Methods, systems, and devices for dynamically assembling modular emergency response solutions with a decentralized data plane are described. In some implementations, a server may receive operational input data defining emergency response requirements for an entity. A generative artificial intelligence model may analyze the operational input data to calculate a required solution shape and identify a plurality of atomic software tools from a tool library, each associated with a semantic interface layer specifying functional attributes and data dependencies. The server may construct a modular configuration blueprint specifying logical relationships among the identified tools and their integration with the decentralized data plane. The server may establish a data lifecycle management protocol to classify and manage information as ephemeral or persistent and configure a zero-trust security framework to govern data access and interactions. The server may deploy the modular configuration blueprint to a designated network endpoint for execution.

20 Claims, 17 Drawing Sheets

(56) References Cited

OTHER PUBLICATIONS

Hireche et al., "Deep data plane programming and AI for zero-trust self-driven networking in beyond 5G", 2022, Elsevier, 11 pages. (Year: 2022).*

Li et al., "Zero-Trust Foundation Models: A New Paradigm for Secure and Collaborative Artificial Intelligence for Internet of Things", Nov. 2025, IEEE, vol. 12, No. 22, pp. 46269-46293. (Year: 2025).*

* cited by examiner

AI data flow 500

ASSEMBLING TAILORED EMERGENCY RESPONSE SOLUTIONS WITH AI-DRIVEN MODULAR ARCHITECTURE PLANE

FIELD OF TECHNOLOGY

The present disclosure relates generally to database systems and data processing, and more specifically to assembling tailored emergency response solutions with AI-driven modular architecture and a decentralized data plane.

BACKGROUND

Emergency response systems may operate within a complex field involving diverse participants, including humans, devices, and artificial intelligence agents. These systems may rely on interconnected networks to facilitate the exchange of information and coordination of activities. Data may be generated from various sources, such as sensors, video feeds, and communication devices, and may be processed to provide actionable intelligence. Participants may interact through defined roles and capabilities, with data flows structured to support decision-making and operational efficiency.

SUMMARY

The described techniques relate to improved methods, systems, devices, and apparatuses that support techniques for assembling tailored emergency response solutions with AI-driven modular architecture and a decentralized data plane. Some implementations may introduce a modular, artificial intelligence-driven system architecture designed to address the limitations of traditional emergency response systems. The system may be built around a decentralized data plane that serves as a shared backbone for all participants, including humans, devices, and artificial intelligence agents. This data plane may enable seamless information exchange and coordination by standardizing data flow through immutable “Post” messages, which may be tagged with attributes such as significance, urgency, and location. The participant model may define each entity’s capabilities, geofence, and authorization profile, ensuring that all interactions occur within a zero-trust security framework. This approach may minimize the risk of unauthorized data access while enabling scalable and secure collaboration among diverse participants.

The system may leverage a semantic interface layer for atomic software tools, which may encapsulate functional capabilities, visual rendering specifications, and resource usage patterns. Artificial intelligence may dynamically analyze operational needs and assemble bespoke emergency response solutions by selecting and configuring these tools. The resulting solutions may be deployed as tailored application viewports, providing users with a customized interface into the safety network. The system may also incorporate a data lifecycle management engine that distinguishes between ephemeral happenings and confirmed incidents, filtering noise and promoting only actionable intelligence. This innovative architecture may enable rapid onboarding of participants, efficient resource allocation, and enhanced decision-making, ultimately optimizing the speed, accuracy, and cost of emergency response operations.

A method for dynamically assembling modular emergency response solutions with a decentralized data plane is described. The method may include receiving, at a server, operational input data defining emergency response requirements for an entity. The method may include analyzing, by a generative AI model, the operational input data to calculate a required solution shape and identifying a plurality of atomic software tools from a tool library to fulfill the required solution shape, each atomic software tool being associated with a semantic interface layer specifying its functional attributes and data dependencies. The method may include constructing, by the server, a modular configuration blueprint that specifies logical relationships among the identified atomic software tools and their integration with a decentralized data plane. The method may include establishing, by the server, a data lifecycle management protocol within the decentralized data plane to classify and manage information as ephemeral or persistent based on predefined criteria. The method may include configuring, by the server, a zero-trust security framework to govern data access and interactions among participants and the decentralized data plane. The method may include deploying, by the server, the modular configuration blueprint to a designated network endpoint for execution.

A system configured for dynamically assembling modular emergency response solutions with a decentralized data plane is described. The system may include a processor and memory coupled with the processor. The system may include instructions stored in the memory and executable by the processor to cause the system to receive operational input data defining emergency response requirements for an entity. The system may analyze, using a generative artificial intelligence (AI) model, the operational input data to calculate a required solution shape and identify a plurality of atomic software tools from a tool library to fulfill the required solution shape, each atomic software tool being associated with a semantic interface layer specifying its functional attributes and data dependencies. The system may construct a modular configuration blueprint that specifies logical relationships among the identified atomic software tools and their integration with a decentralized data plane. The system may establish a data lifecycle management protocol within the decentralized data plane to classify and manage information as ephemeral or persistent based on predefined criteria. The system may configure a zero-trust security framework to govern data access and interactions among participants and the decentralized data plane. The system may deploy the modular configuration blueprint to a designated network endpoint for execution.

Another system for dynamically assembling modular emergency response solutions with a decentralized data plane is described. The system may include means for receiving, at a server, operational input data defining emergency response requirements for an entity. The system may include means for analyzing, by a generative AI model, the operational input data to calculate a required solution shape and identifying a plurality of atomic software tools from a tool library to fulfill the required solution shape, each atomic software tool being associated with a semantic interface layer specifying its functional attributes and data dependencies. The system may include means for constructing, by the server, a modular configuration blueprint that specifies logical relationships among the identified atomic software tools and their integration with a decentralized data plane. The system may include means for establishing, by the server, a data lifecycle management protocol within the decentralized data plane to classify and manage information as ephemeral or persistent based on predefined criteria. The system may include means for configuring, by the server, a zero-trust security framework to govern data access and interactions among participants and the decentralized data plane. The system may include means for deploying, by the server, the modular configuration blueprint to a designated network endpoint for execution.

A non-transitory computer-readable medium storing code for dynamically assembling modular emergency response solutions with a decentralized data plane is described. The code may include instructions executable by a processor to receive operational input data defining emergency response requirements for an entity. The code may include instructions executable by a processor to analyze the operational input data using a generative AI model to calculate a required solution shape and identify a plurality of atomic software tools from a tool library to fulfill the required solution shape, each atomic software tool being associated with a semantic interface layer specifying its functional attributes and data dependencies. The code may include instructions executable by a processor to construct a modular configuration blueprint that specifies logical relationships among the identified atomic software tools and their integration with a decentralized data plane. The code may include instructions executable by a processor to establish a data lifecycle management protocol within the decentralized data plane to classify and manage information as ephemeral or persistent based on predefined criteria. The code may include instructions executable by a processor to configure a zero-trust security framework to govern data access and interactions among participants and the decentralized data plane. The code may include instructions executable by a processor to deploy the modular configuration blueprint to a designated network endpoint for execution.

Some examples of the method, systems, and non-transitory computer-readable medium described herein may further include operations, features, means, or instructions for calculating a predicted cost estimation profile for the modular configuration blueprint. The predicted cost estimation profile may be calculated by aggregating AI token consumption, computational load, and storage requirements defined within the semantic interface layer of each identified atomic software tool.

In some examples of the method, systems, and non-transitory computer-readable medium described herein, transmitting a notification may comprise publishing a standardized post object to a broker service within the decentralized data plane. The broker service may distribute the post object to subscribing participants affected by the change in the modular configuration blueprint.

Some examples of the method, systems, and non-transitory computer-readable medium described herein may further include operations, features, means, or instructions for validating the modular configuration blueprint. The validation may be performed by instantiating a simulated network environment populated by autonomous AI agents and executing a set of test prompts defined within the semantic interface layers to verify functional interoperability.

In some examples of the method, systems, and non-transitory computer-readable medium described herein, managing information may comprise encapsulating data within immutable post objects. Assigning priority levels may comprise populating metadata fields within the post objects defined for significance and urgency to govern routing logic within the decentralized data plane.

In some examples of the method, systems, and non-transitory computer-readable medium described herein, monitoring the execution may comprise utilizing a data plane connector embedded within each atomic software tool. The data plane connector may automatically log operational exhaust and outcome metrics to a shared ledger within the decentralized data plane.

In some examples of the method, systems, and non-transitory computer-readable medium described herein, the semantic interface layer may comprise non-executable visual design specifications. Constructing the blueprint may comprise generating a user interface layout by interpreting the visual design specifications via the generative AI model.

In some examples of the method, systems, and non-transitory computer-readable medium described herein, the data lifecycle management protocol may be configured to instantiate incoming data emissions as ephemeral 'happening' objects. The data lifecycle management protocol may promote the 'happening' objects to persistent 'incident' objects only upon satisfying a validity threshold determined by the generative AI model.

In some examples of the method, systems, and non-transitory computer-readable medium described herein, the modular configuration blueprint may specify a hierarchical arrangement of atomic software tools. The dependencies among the tools may be defined by their respective semantic interface layers.

In some examples of the method, systems, and non-transitory computer-readable medium described herein, the zero-trust security framework may enforce access control policies by dynamically verifying participant credentials against a registry of authorized roles and capabilities.

In some examples of the method, systems, and non-transitory computer-readable medium described herein, the decentralized data plane may include a stream hub configured to manage real-time data streams. The modular configuration blueprint may incorporate stream subscriptions for participants requiring continuous data updates.

In some examples of the method, systems, and non-transitory computer-readable medium described herein, the operational input data may include geospatial parameters. The modular configuration blueprint may incorporate geofencing logic to restrict data access and tool functionality based on the specified geospatial parameters.

DETAILED DESCRIPTION

Figure 1:
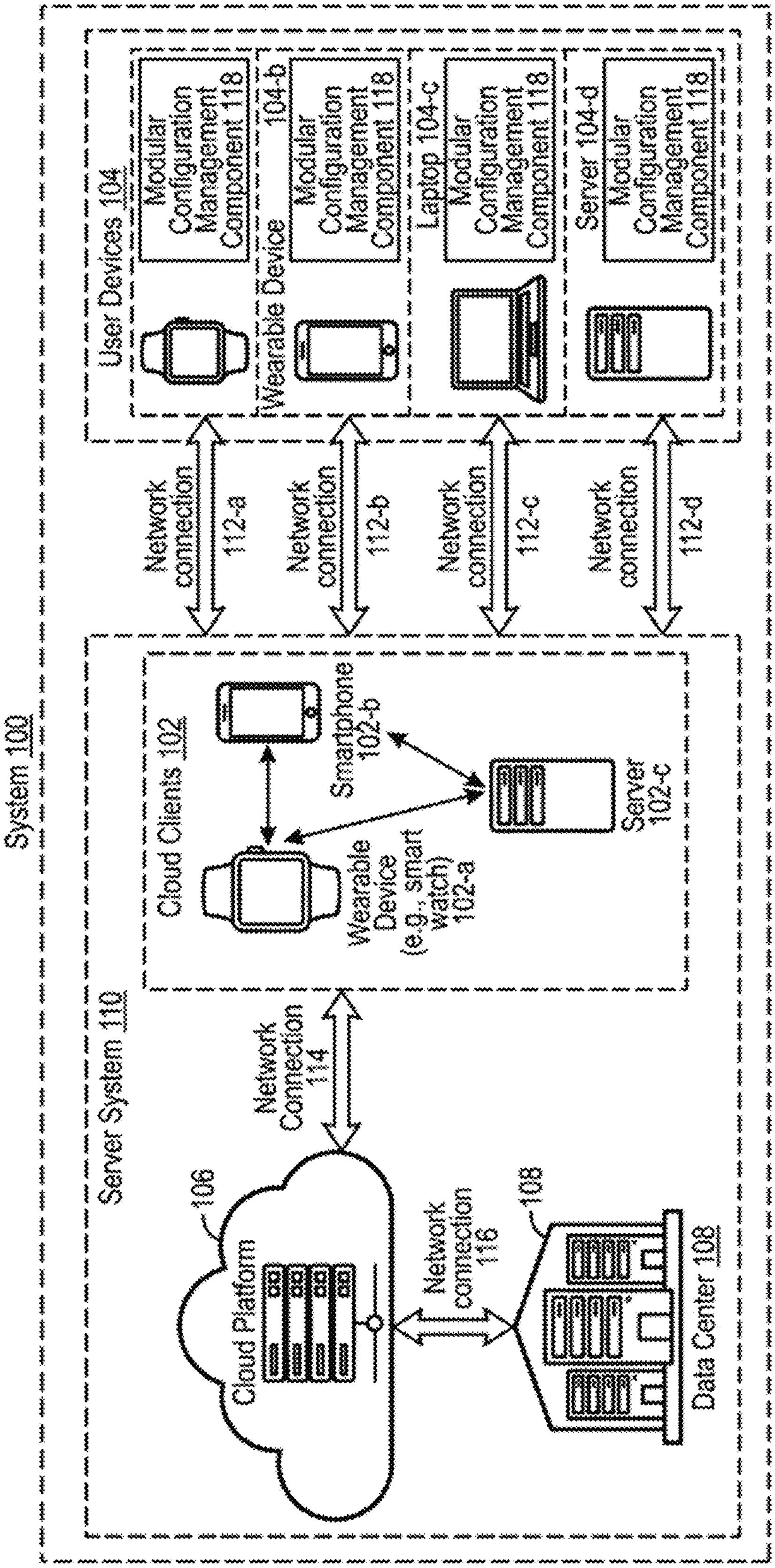
FIG. 1 illustrates an example of a system for data processing that supports assembling tailored emergency response solutions with AI-driven modular architecture and a decentralized data plane in accordance with aspects of the present disclosure.

Methods, systems, devices, and apparatuses that support techniques for assembling tailored emergency response solutions with AI-driven modular architecture and a decentralized data plane are disclosed. In some examples, current emergency response systems may face significant challenges in addressing the diverse and dynamic needs of organizations. These systems may often be constrained by their monolithic design, which may limit their ability to adapt to the unique operational requirements of different users, such as emergency call centers, law enforcement agencies, private security organizations, including Global Security Operations Centers (GSOCs), which monitor and manage safety across corporate or distributed campuses. The lack of a unified data model and dynamic assembly capabilities may hinder the seamless integration of new data sources and tools, creating information silos and reducing operational efficiency. Additionally, existing systems may struggle to manage the lifecycle of data, from ephemeral events to confirmed incidents, in a way that minimizes noise and maximizes actionable intelligence. Security concerns may further exacerbate these issues, as many systems may lack robust zero-trust frameworks to ensure secure and controlled data sharing among participants. These limitations may result in inefficiencies, increased costs, and reduced effectiveness in emergency response scenarios.

In some implementations, a modular system architecture may be designed to enable components to operate independently, with each module responsible for specific functionalities. These modules may include features such as incident management, mapping and geographic information systems, communication, transcription, dispatch, search, and analysis. Each module may have its own backend system to fetch and render data, allowing for independent design, development, maintenance, and scaling by separate teams. The modular components may be assembled like building blocks to create tailored solutions for specific operational needs, enabling rapid updates to individual areas without affecting the rest of the system. This modular approach may provide flexibility and scalability, ensuring that the system can adapt to diverse use cases and evolving requirements.

Some implementations may incorporate artificial intelligence to dynamically assemble solutions based on operational needs. Artificial intelligence may analyze a user's problem statement and map it to a set of modular components that address the identified requirements. It may also check for compatibility, prerequisites, and dependencies among the selected components, generating a solution blueprint that describes the building blocks, their interactions, data flow, user interface layout, and other relevant details. Once the blueprint is created, artificial intelligence may assemble the components into a live, interactive solution that users may preview and modify in real time. After finalization, artificial intelligence may prepare, package, and deploy the solution, streamlining the process of creating and implementing customized systems.

In some implementations, a decentralized data plane may serve as the backbone of the system, acting as a digital representation of the real world where all relevant information may be recorded and shared. The data plane may include services such as a ledger for storing immutable messages, a broker for distributing messages to interested entities, a configuration service for managing credentials and preferences, a registry for advertising and discovering capabilities, and a streaming hub for managing real-time data streams like video and audio telemetry. All interactions between entities may occur through the data plane, which may operate under a zero-trust security model. This model may ensure that each entity validates requests and authorizations before sharing information, enhancing security and trust across the system.

Entities interacting with the system may be modeled as participants, which may include humans, devices, and artificial intelligence agents. Participants may have attributes such as a defined geographical boundary within which they operate, a list of technical and operational capabilities, and an authorization profile that defines their permissions and access rights. Participants may belong to organizations that manage multiple participants and their capabilities, enabling structured coordination. Through the data plane, participants may post, subscribe to, and respond to information, ensuring seamless communication and collaboration. This interaction model may provide visibility and traceability for all actions, supporting accountability and efficient operations.

Each modular component or software tool may be encapsulated by a semantic interface layer, which may provide metadata and guidance for artificial intelligence-driven assembly. This layer may include descriptions of the tool's functional capabilities, specifications for rendering the tool in a user interface, definitions of data requirements and outputs, and best practices for integrating the tool into a larger solution. By leveraging the semantic interface layer, artificial intelligence may effectively understand how to use each tool, ensuring that solutions are assembled accurately and efficiently. This approach may also facilitate the integration of new tools into the system without disrupting existing functionality.

In some implementations, application viewports may be dynamically generated to meet the specific operational needs of each participant. These viewports may serve as interfaces for participants to interact with the system and the data plane, providing features such as shared navigation, role-based access, notifications, branding, and responsive layouts. The viewports may be accessible across multiple platforms, including desktop, web, and mobile, ensuring flexibility and usability. By leveraging modular components and semantic interface layers, the system may create personalized and intuitive interfaces that enhance user experience. This capability may allow participants to focus on their tasks while interacting seamlessly with the system.

A zero-trust security framework may be implemented to ensure that each participant validates requests and authorizations before sharing information. Authorization may be enforced at the recipient level, and credential tokens may be used to verify the identity and permissions of participants. This framework may prevent unauthorized access to sensitive information, maintaining the integrity and confidentiality of the system. Additionally, the system may support flexible data residency options, including centralized storage, customer-specific data planes, and hierarchical local-global data planes. These options may allow customers to manage their own data storage and access policies, ensuring compliance with privacy regulations and organizational requirements.

The system may manage the lifecycle of data from raw information emissions, referred to as happenings, to confirmed incidents. Happenings may be ephemeral and may not always materialize into incidents, as the system may automatically filter and process happenings, promoting them to incidents only when specific thresholds are met. Incidents may be modeled as digital representations of real-world events, with attributes such as a timeline of related information, a responsible participant managing the incident, a team of participants working on the incident, and a status indicating the current state of the incident. This structured approach to incident management may enable efficient tracking, coordination, and resolution of events.

Artificial intelligence agents may perform a variety of tasks to enhance system functionality and decision-making. These tasks may include summarizing call transcripts, activating protocols, monitoring adherence, tracking responder locations, detecting anomalies, identifying operational problems, correlating incidents, and escalating incidents. Artificial intelligence agents may interact with the data plane to process information, generate recommendations, and coordinate responses. By analyzing data in real time, artificial intelligence may enable proactive decision-making and improve the overall efficiency of the system. This capability may be particularly valuable in emergency response scenarios, where timely and accurate actions are critical.

Real-time data streaming may be supported through the streaming hub, allowing participants to subscribe to live data streams such as video and audio telemetry. The data plane may enable analytics by capturing and storing data from all participants, which may be used for monitoring, reporting, and decision-making. Resource usage patterns may be calculated, and real-time billing models may be generated to provide transparency for customers. Additionally, tools for data tracing and observability may be included, allowing users to inspect the history of events on the data plane and understand why specific actions were taken by artificial intelligence. This capability may enhance accountability and provide insights for system optimization.

The system may be extensible, allowing new participants and capabilities to be added without disrupting existing functionality. The modular architecture and data plane may enable horizontal scaling, supporting a large number of participants and diverse use cases. Uniform coordination between participants may be ensured through standardized communication protocols, enabling seamless collaboration. Participants may send and receive requests, responses, and results, while a contact list model may allow them to discover and interact with others based on their capabilities. This extensibility and coordination may foster innovation, enabling the rapid development and deployment of new solutions.

The system may prioritize artificial intelligence-first design, where data may be processed and formatted for artificial intelligence consumption before being rendered for human users. Artificial intelligence may be optimized for decision-making by providing the context and information needed to perform tasks effectively. A standardized design system may be included, featuring defined personas, human factors guidelines, data display standards, and a glossary of terms. A library of components, variables, and templates may ensure consistency in solution assembly and deployment. This design approach may enable rapid prototyping and deployment of solutions, allowing customers to interact with a live preview of their solution during the design process.

The system may provide robust data analytics and reporting capabilities, leveraging data captured on the data plane to generate insights. Historical data may be analyzed to identify trends and improve future responses. Data may be organized into a hierarchy, with streams representing real-time data, data representing persistent artifacts, and intelligence representing processed information. Bundles of data and intelligence related to specific entities or events may be referred to as subjects. By analyzing this data, artificial intelligence may detect anomalies, track responder locations, correlate incidents, and identify patterns and trends, enabling proactive and informed decision-making.

Finally, the system may be designed to ensure resilience and reliability, with features such as customer isolation and the ability to spin up and terminate participants as needed. The data plane architecture may support fault tolerance, ensuring continuity of operations even in the event of failures. Immutable messages, referred to as posts, may be used as the primary data structure for communication and coordination, with attributes such as an identifier, timestamp, poster identifier, organization scope, location, and content. The use of immutable posts may ensure data integrity and provide a reliable foundation for decision-making and analytics. By connecting participants through the data plane, the system may enable real-time response and coordination, allowing artificial intelligence agents to monitor and process data, generate recommendations, and coordinate actions to address incidents and emergencies effectively.

Aspects of the subject matter described in this disclosure can be implemented to realize one or more of the following potential advantages. The described techniques may be implemented to support scalable and modular system architectures that enable rapid customization and deployment of solutions tailored to diverse operational needs. The system may facilitate seamless integration of new tools and participants through standardized interfaces and semantic layers, ensuring compatibility and efficient assembly of components. By leveraging a decentralized data plane, the system may enhance security and trust through a zero-trust framework, where participants validate requests and authorizations before sharing information. Artificial intelligence may dynamically process and analyze data in real time, enabling proactive decision-making and efficient resource allocation in critical scenarios. The system may provide a unified platform for participants to interact with real-time and historical data, fostering collaboration and accountability while maintaining data integrity through immutable message structures. By supporting horizontal scaling and extensibility, the system may accommodate a growing number of participants and evolving use cases without disrupting existing operations.

Aspects of the disclosure are initially described in the context of networked computing systems. Aspects of the disclosure are additionally illustrated by and described with reference to example implementations. Aspects of the disclosure are further illustrated by and described with reference to apparatus diagrams, system diagrams, and flowcharts that relate to assembling tailored emergency response solutions with AI-driven modular architecture and a decentralized data plane.

FIG. 1 illustrates an example of a system 100 that supports assembling tailored emergency response solutions with AI-driven modular architecture and decentralized data plane in accordance with various aspects of the present disclosure. The system 100 includes cloud client(s) 102, user devices 104, a cloud platform 106, and data center(s) 108. Cloud platform 106 may be an example of a public or private cloud network. A cloud client 102 may access cloud platform 106 over a network connection 114. The network connection 114 may include a wired connection, a wireless connection, or both. The network may implement transfer control protocol and internet protocol (TCP/IP), such as the Internet, or may implement other network protocols. A cloud client 102 may be an example of a computing device, such as a wearable device (e.g., cloud client 102-*a*), a smartphone (e.g., cloud client 102-*b*), or a server (e.g., cloud client 102-*c*). In other examples, a cloud client 102 may be a desktop or laptop computer, a tablet, a sensor, or another computing device or system capable of generating, analyzing, transmitting, or receiving communications. In some examples, a cloud client 102 may be part of a business, an enterprise, a non-profit, a startup, or any other organization type.

A cloud client 102 may facilitate communication between the data center 108 and one or multiple user devices 104 to implement an online environment. The network connection(s) 112 may include communications, opportunities, purchases, sales, or any other interaction between a cloud client 102 and a user device 104. The network connection 112 may include a wired connection, a wireless connection, or both. A cloud client 102 may access cloud platform 106 to store, manage, and process the data communicated via one or more network connections 112. In some cases, the cloud client 102 may have an associated security or permission level. A cloud client 102 may have access to certain applications, data, and database information within cloud platform 106 based on the associated security or permission level, and may not have access to others.

The user device 104 may include a modular configuration management component 118. The user device 104 may interact with the cloud client 102 over network connection 112. The network may implement transfer control protocol and internet protocol (TCP/IP), such as the Internet, or may implement other network protocols. The network connection 112 may facilitate transport of data via email, web, text messages, mail, or any other appropriate form of electronic interaction (e.g., network connections 112-*a*, 112-*b*, 112-*c*, and 112-*d*) via a computer network. In an example, the user device 104 may be a computing device such as a wearable device 104-*a*, a smartphone 104-*b*, a laptop 104-*c* or a server 104-*d*. In other cases, the user device 104 may be another computing system. In some cases, the user device 104 may be operated by a user or group of users. The user or group of users may be a customer, associated with a business, a manufacturer, or any other appropriate organization.

Cloud platform 106 may offer an on-demand database service to the cloud client 102. In some cases, cloud platform 106 may be an example of a multi-tenant database system. In this case, cloud platform 106 may serve multiple cloud clients 102 with a single instance of software. However, other types of systems may be implemented, including, but not limited to, client-server systems, mobile device systems, and mobile network systems. In some cases, cloud platform 106 may support an online application. This may include support for sales between buyers and sellers operating user devices 104, service, marketing of products posted by buyers, community interactions between buyers and sellers, analytics, such as user-interaction metrics, applications (e.g., computer vision and machine learning), and the Internet of Things (IoT). Cloud platform 106 may receive data associated with generation of an online environment from the cloud client 102 over network connection 114, and may store and analyze the data. In some cases, cloud platform 106 may receive data directly from a user device 104 and the cloud client 102. In some cases, the cloud client 102 may develop applications to run on cloud platform 106. Cloud platform 106 may be implemented using remote servers. In some cases, the remote servers may be located at one or more data centers 108.

Data center 108 may include multiple servers. The multiple servers may be used for data storage, management, and processing. Data center 108 may receive data from cloud platform 106 via connection 116, or directly from the cloud client 102 or via network connection 112 between a user device 104 and the cloud client 102. The connection 116 may include a wired connection, a wireless connection, or both. Data center 108 may utilize multiple redundancies for security purposes. In some cases, the data stored at data center 108 may be backed up by copies of the data at a different data center (not pictured).

Server system 110 may include cloud clients 102, a cloud platform 106, a modular configuration management component 118, and a data center 108 that may coordinate with cloud platform 106 and data center 108 to implement an online environment. In some cases, data processing may occur at any of the components of server system 110, or at a combination of these components. Thus, the modular configuration management component 118 may be included in the user device 104, server system 110, or in part or in whole in both. In some cases, servers may perform the data processing. The servers may be a cloud client 102 or located at data center 108.

Some or all of the functionality attributed to the modular configuration management component 118 may be embodied or performed by one or more user devices 104, one or more components of server system 110 (e.g., cloud clients 102, a cloud platform 106, and/or a data center 108), and/or other components of system 100. The modular configuration management component 118 may receive signals and inputs from user device 104 directly. via cloud clients 102, and/or via cloud platform 106 or data center 116.

As described herein, the modular configuration management component 118 may facilitate the dynamic assembly of tailored emergency response solutions by leveraging the decentralized data plane and the AI-driven architecture of system 100. The component 118 may receive operational input data from user devices 110 or cloud clients 102 and may utilize a generative AI model to analyze the input data to determine a required solution shape (also referred to herein as the 'Viewport Shape'). Based on this analysis, the modular configuration management component 118 may identify atomic software tools from a tool library, each associated with a semantic interface layer, and may construct a modular configuration blueprint that defines the logical relationships among the tools and their integration with the decentralized data plane. The component 118 may establish a data lifecycle management protocol to classify and manage information as ephemeral or persistent and may configure a zero-trust security framework to govern data access and interactions. The modular configuration management component 118 may then deploy the modular configuration blueprint to a designated network endpoint, enabling execution of the tailored emergency response solution.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
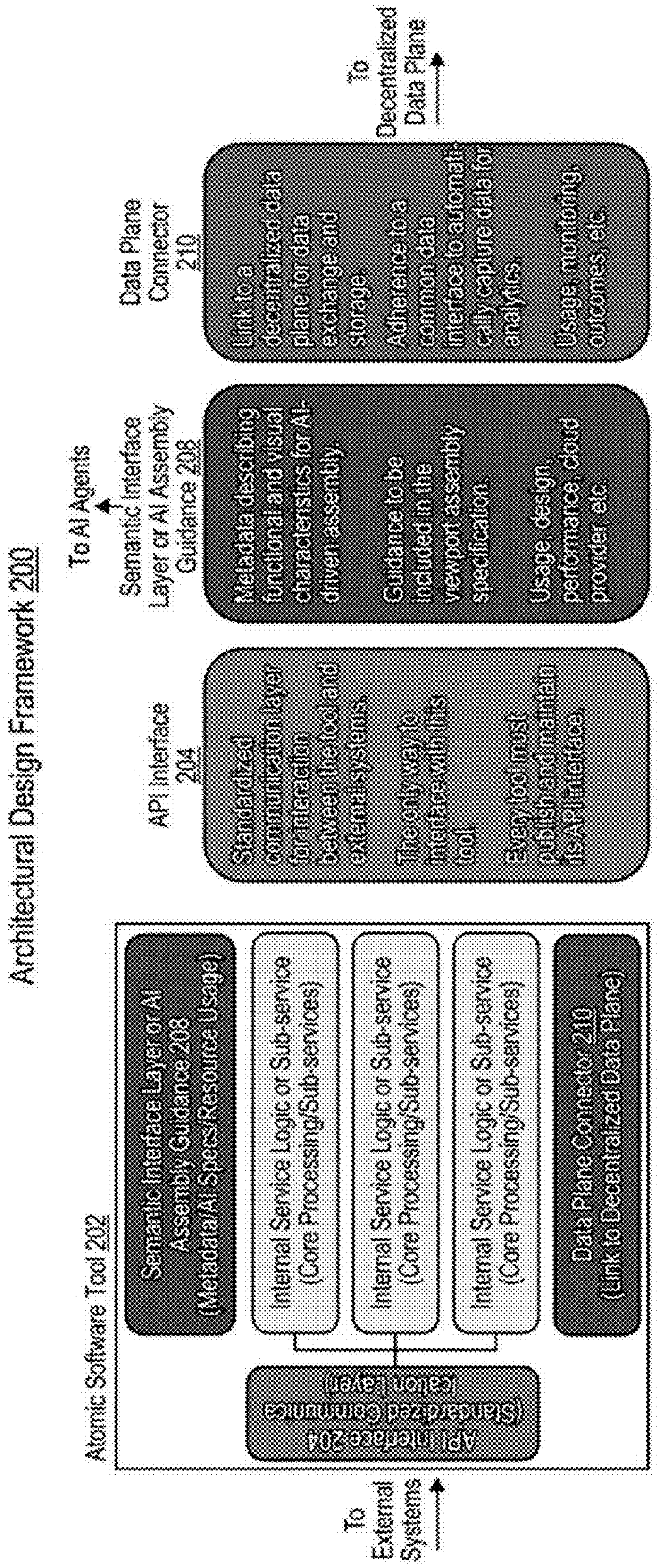
FIG. 2 shows an architectural design framework which supports techniques for assembling tailored emergency response solutions with AI-driven modular architecture and a decentralized data plane in accordance with various aspects of the present disclosure.

FIG. 2 shows architectural design framework for a standardized tool architecture 200 which supports techniques for assembling tailored emergency response solutions with AI-driven modular architecture and decentralized data plane in accordance with various aspects of the present disclosure. As depicted in FIG. 2, the standardized tool architecture 200 may include one or more of an Atomic Software Tool 202; an API Interface 204; an Internal Service Logic or Sub-service (Refers to the "service sub" components) 206; a Semantic Interface Layer or AI Assembly Guidance 208; and a Data Plane Connector 210, and/or other components.

The standardized tool architecture 200 may include a framework for integrating various components to support tailored emergency response solutions. The standardized tool architecture 200 may include a modular design that allows for the seamless integration of various atomic software tools. The framework may be designed to support scalability and flexibility, enabling the addition or removal of components based on specific operational requirements. The standardized tool architecture 200 may interact with the data plane to ensure consistent communication and data exchange between components. In some implementations, the standardized tool architecture 200 may include predefined templates or guidelines for assembling components into cohesive solutions.

The atomic software tool 202 may represent a modular unit designed to perform specific functionalities within the architectural design framework. The atomic software tool 202 may include self-contained functionalities that address distinct operational needs, such as data ingestion, transcription, or mapping. The atomic software tool 202 may operate independently or in conjunction with other tools within the standardized tool architecture 200. In some implementations, the atomic software tool 202 may be designed to interact with the data plane connector 210 to exchange data with other participants in the safety network.

The API interface 204 may include a standardized communication layer for interaction between the atomic software tool 202 and external systems. The API interface 204 may define a set of protocols and methods that allow external systems to interact with the atomic software tool 202. The API interface 204 may support various data formats and communication protocols to ensure compatibility with diverse external systems. In some implementations, the API interface 204 may include authentication mechanisms to verify the identity of external systems before granting access to the atomic software tool 202.

The internal service logic or sub-service 206 may include operational components or sub-services that execute specific tasks within the atomic software tool 202. The internal service logic or sub-service 206 may be responsible for processing data, executing algorithms, or managing workflows within the atomic software tool 202. The internal service logic or sub-service 206 may interact with the API interface 204 to receive input data and provide output results. In some implementations, the internal service logic or sub-service 206 may include specialized modules for handling tasks such as data validation, transformation, or analysis.

The semantic interface layer or AI assembly guidance 208 may represent metadata or instructions that describe the functional and visual characteristics of the atomic software tool 202 for AI-driven assembly. The semantic interface layer or AI assembly guidance 208 may include machine-readable descriptions of the tool's capabilities, input/output requirements, and visual rendering specifications. In some implementations, the semantic interface layer 208 may further comprise resource usage definitions (e.g., computational load, token consumption, storage intensity, etc.) utilized by an AI model to calculate a predicted cost profile for the tool prior to deployment. The semantic interface layer or AI assembly guidance 208 may enable AI systems to understand how to assemble and utilize the atomic software tool 202 within a larger solution. In some implementations, the semantic interface layer or AI assembly guidance 208 may include predefined templates or examples to guide the AI in assembling user interfaces or workflows.

The data plane connector 210 may include a mechanism for linking the atomic software tool 202 to a decentralized data plane for data exchange and storage. The data plane connector 210 may facilitate the transmission of data, intelligence, and requests between the atomic software tool 202 and other participants in the safety network. The data plane connector 210 may support real-time data streaming, persistent data storage, and retrieval operations. In some implementations, the data plane connector 210 may include mechanisms for tagging and categorizing data to enable efficient search and retrieval.

In some implementations, the standardized tool architecture 200 may arrange the atomic software tool 202 as a modular component within the system, encapsulated by the API interface 204, the internal service logic or sub-service 206, the semantic interface layer or AI Assembly Guidance 208, and the data plane connector 210. The atomic software tool 202 may interact with the API interface 204 to publish and maintain its functional capabilities, allowing external systems to communicate with the tool through standardized operations.

In some implementations, the internal service logic or sub-service 206 may operate as the core processing unit within the atomic software tool 202, performing specific backend functions that align with the tool's designated capabilities. The semantic interface layer or AI Assembly Guidance 208 may define metadata specifications for the atomic software tool 202, which may include usage patterns, visual rendering details, and resource requirements, enabling artificial intelligence agents to determine how the tool may be assembled into broader solutions.

In some implementations, the data plane connector 210 may serve as a bridge between the atomic software tool 202 and the decentralized data plane, allowing the tool to log, monitor, and retrieve information from the shared repository. The interaction between the data plane connector 210 and the internal service logic or sub-service 206 may ensure that the tool's operations align with the hierarchical structures and authorization profiles defined within the participant model.

Figure 3:
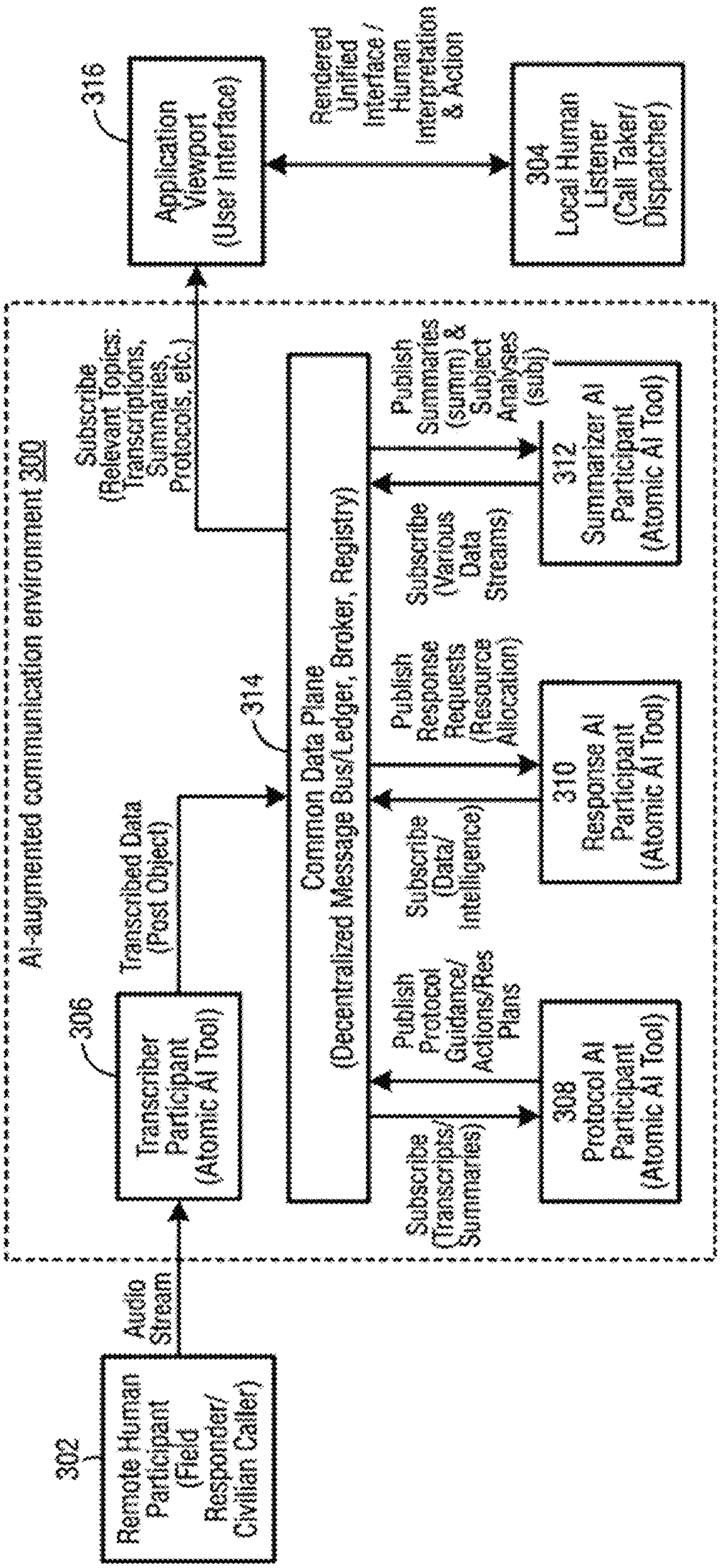
FIG. 3 shows an AI communication flowchart which supports techniques for assembling tailored emergency response solutions with AI-driven modular architecture and a decentralized data plane in accordance with various aspects of the present disclosure.

FIG. 3 shows an AI-augmented communication environment 300 which supports techniques for assembling tailored emergency response solutions with an AI-driven modular architecture and decentralized data plane in accordance with various aspects of the present disclosure. As depicted in FIG. 3, the AI-augmented communication environment 300 may include one or more of a Remote Human Participant 302; a Local Human Listener 304; a Transcriber Participant 306; a Protocol AI Participant 308; a Response AI Participant 310; a Summarizer AI Participant 312; a Common Data Plane 314; an Application Viewport 316; and/or other components.

The AI-augmented communication environment 300 may include a system that integrates human and AI participants for emergency response coordination. The AI-augmented communication environment 300 may include various components that interact seamlessly to process, analyze, and share information during emergency scenarios. The AI-augmented communication environment 300 may support the exchange of data and intelligence through a common platform, enabling participants to collaborate effectively. In some implementations, the environment 300 treats autonomous agents and human operators as equipotent participants on the network.

The remote human participant 302 may represent an external entity, such as a field responder utilizing a radio or a civilian caller, generating an audio stream. The remote human participant 302 may transmit data or intelligence, such as audio or text, to other participants in the AI-augmented communication environment 300.

The local human listener 304 may include personnel such as call takers or dispatchers who receive and process information. The local human listener 304 may interpret and act on the information received, often using the application viewport 316 to access relevant data. The local human listener 304 serves as a subscriber to the data plane 314, consuming intelligence generated by AI participants rather than managing raw data streams directly.

The transcriber participant 306 may include an atomic AI tool that functions as a network participant. The transcriber participant 306 may ingest the raw audio stream from the remote human participant 302 and generate text-based transcriptions. Crucially, the transcriber participant 306 publishes the transcribed data as a standardized post object to the common data plane 314, making it immediately available to any subscribing entity.

The protocol AI participant 308 may include an atomic AI tool that subscribes to data on the common data plane 314. Upon analyzing incoming posts (e.g., transcripts or summaries), the protocol AI participant 308 may determine applicable procedures and publish protocol guidance, actions, or response plans to the data plane 314.

The response AI participant 310 may include an atomic AI tool that determines and initiates appropriate response actions. The response AI participant 310 may evaluate data and intelligence from the common data plane 314 to identify suitable actions, such as resource allocation requests. The response AI participant 310 publishes these requests back to the data plane 314, allowing other participants (e.g., a drone or helicopter) to react asynchronously.

The summarizer AI participant 312 may include an atomic AI tool that generates intelligence for clarity and decision-making. The summarizer AI participant 312 subscribes to various data streams on the common data plane 314 to create concise summaries ("summ") and subject analyses ("subj"). The summarizer AI participant 312 posts these summaries to the common data plane 314, acting as an intelligence filter for the human listener. The common data plane 314 may include a decentralized message bus where participants exchange and store information through immutable posts. The common data plane 314 serves as the primary medium for communication, decoupling the producers of data (e.g., Transcriber 306) from the consumers (e.g., Viewport 316). The common data plane 314 may support operations such as posting, searching, and subscribing to data streams via a ledger, broker, and registry architecture.

The application viewport 316 may include a user interface that displays relevant information to human participants. The application viewport 316 subscribes to the relevant topics on the common data plane 314 (e.g., transcriptions, summaries, protocols, etc.) and renders them into a unified interface optimized for human interpretation.

In some implementations, the AI-augmented communication environment 300 arranges its components to facilitate seamless interaction. The remote human participant 302 transmits audio input, which is routed to the transcriber participant 306. The transcriber participant 306 processes the audio and posts a transcription to the common data plane 314.

In some implementations, the protocol AI participant 308 retrieves the transcription from the common data plane 314, analyzes it to determine the appropriate protocol, and posts its findings back to the data plane. The response AI participant 310 may then access this information to generate specific response requests. These requests are transmitted back to the common data plane 314 and subsequently rendered for the local human listener 304 through the application viewport 316.

In some implementations, the summarizer AI participant 312 subscribes to relevant data streams on the common data plane 314 to extract key information. The summarizer AI participant 312 generates concise summaries, which are displayed to the local human listener 304 via the application viewport 316. This arrangement allows the local human listener 304 to benefit from the collective intelligence of multiple AI agents without requiring manual integration between the specific tools.

Figure 4:
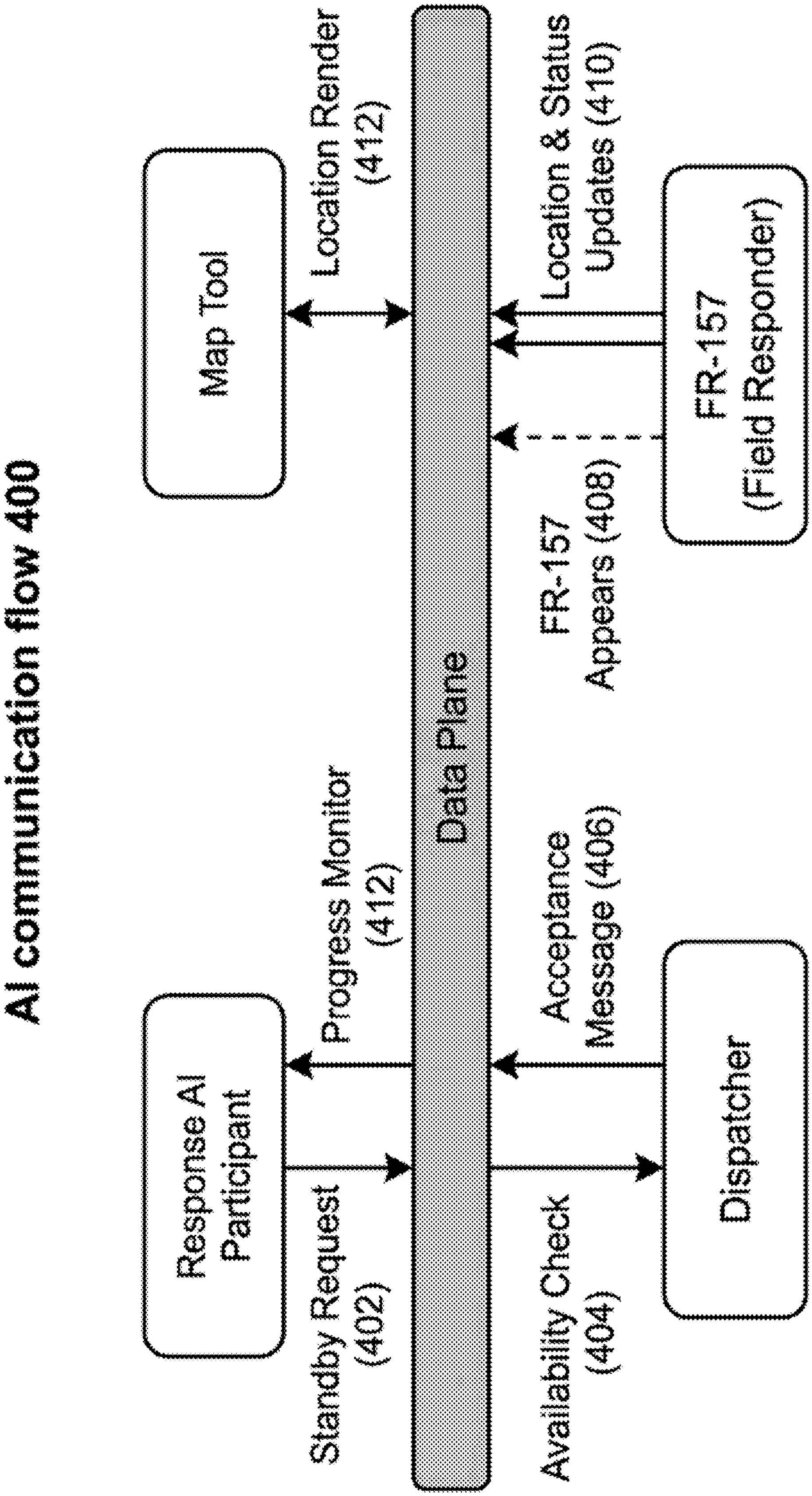
FIG. 4 illustrates an AI communication flow that supports techniques for assembling tailored emergency response solutions with AI-driven modular architecture and a decentralized data plane in accordance with various aspects of the present disclosure.

FIG. 4 illustrates an AI communication flow 400 that supports techniques for assembling tailored emergency response solutions with AI-driven modular architecture and decentralized data plane in accordance with various aspects of the present disclosure. Operations illustrated in the AI communication flow 400 may involve a response AI participant, a dispatcher, an agent or field responder (FR) (e.g., fire, police, EMT, air ambulance, drone response, etc.), a data plane, and a map tool, and/or other participants, which may be examples of corresponding devices described herein. The AI communication flow 400 may describe a process for coordinating emergency response actions through real-time data exchange and participant collaboration.

At 402, the response AI participant may send a request to put a FR on standby. In some implementations, the request may include metadata such as urgency, location, and the type of incident requiring the FR. The response AI participant may post this request as an immutable message to the data plane, tagged with attributes like significance and confidence. The request may reference prior posts on the data plane to establish context for the FR's standby need. The response AI participant may use the registry service of the data plane to identify the dispatcher as a participant capable of handling the request.

At 404, the dispatcher may accept the request and determine the availability of a FR, with the crew potentially confirming readiness. In some implementations, the dispatcher may query the registry on the data plane to match the request with a FR participant that has the required capabilities. The dispatcher may post a message to the data plane indicating the acceptance of the request and the initiation of the availability check. The crew associated with the FR may post their readiness status to the data plane, which the dispatcher may monitor. The dispatcher may use the configuration service of the data plane to retrieve operational preferences and procedures relevant to the FR's deployment.

At 406, the dispatcher may respond with an acceptance message. In some implementations, the acceptance message may include details such as the FR's identifier, estimated time to readiness, and any constraints on its deployment. The dispatcher may post this acceptance message to the data plane, allowing other participants, such as the response AI participant, to subscribe to updates. The acceptance message may reference the original request post to maintain traceability and context. The dispatcher may tag the acceptance message with attributes like confidence and urgency to inform downstream participants.

At 408, a new participant may appear on the data plane as "FR-157." In some implementations, the FR participant may register itself on the data plane with a unique identifier and a list of its capabilities, such as medical transport or aerial surveillance. The FR participant may post an initial status message to the data plane, indicating its activation and readiness to respond. The registry service of the data plane may update to include the FR participant, making it discoverable to other participants. The FR participant may subscribe to relevant posts on the data plane to stay informed about the incident it is assigned to.

At 410, the FR may post its location and status updates to the data plane. In some implementations, the location updates may include GPS coordinates and timestamps, which are tagged with the incident ID for context. The status updates may detail the FR's operational state, such as en route, on standby, or on scene. The FR participant may use the data plane's ledger service to store these updates as immutable posts for auditability. The updates may be consumed by other participants, such as the response AI participant, to monitor the FR's progress and adjust plans as needed.

At 412, the response AI participant may monitor and check the progress of the FR. In some implementations, the response AI participant may subscribe to the FR's location and status updates on the data plane to track its movements in real time. The response AI participant may use the map tool to render the FR's location visually for human operators. The response AI participant may post additional requests or messages to the data plane if adjustments to the FR's mission are required. The response AI participant may analyze the FR's updates to detect potential delays or deviations from the planned route.

Figure 5:
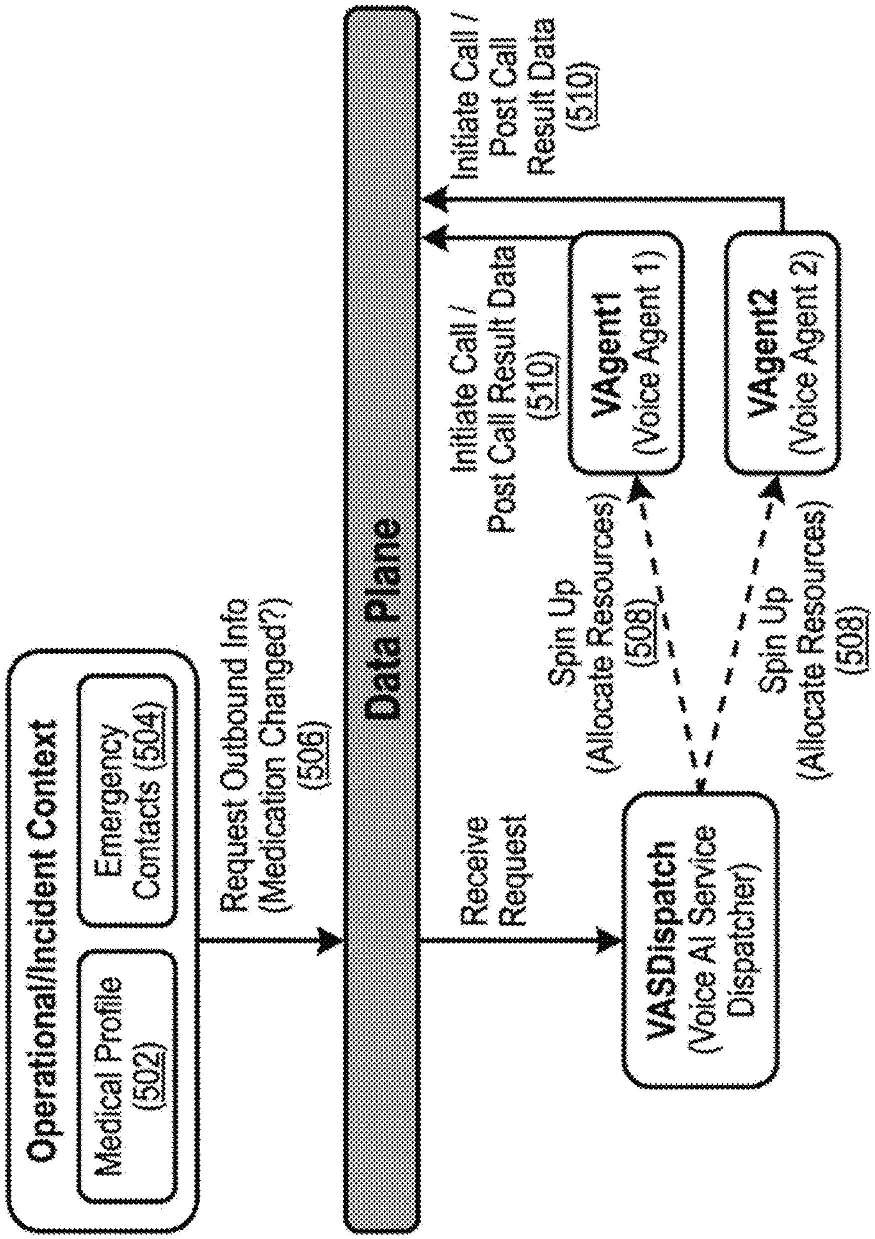
FIG. 5 illustrates an AI data flow that supports techniques for assembling tailored emergency response solutions with AI-driven modular architecture and a decentralized data plane in accordance with various aspects of the present disclosure.

FIG. 5 illustrates an AI data flow 500 that supports techniques for assembling tailored emergency response solutions with AI-driven modular architecture and decentralized data plane in accordance with various aspects of the present disclosure. Operations illustrated in the AI data flow 500 may involve operational or incident context, a data plane, Voice AI Service Dispatcher (VASDispatch), a first Voice Agent (VAgent1), and second Voice Agent (VAgent2), and/or other participants, which may be examples of corresponding devices described herein. The VASDispatch acts as an orchestrator or manager for voice-related tasks within the network. For instance, when a request is posted to the Data Plane (e.g., a Call-Taker requesting an outbound call to check on medication changes), the VASDispatch receives this request. Instead of making the call itself, the VASDispatch "spins up" (activates or instantiates) specific AI participants, such as VAgent1 and VAgent2, to handle the workload. These exemplary Voice Agents are individual Participants on the Safety Network, specifically spun up to execute voice tasks and represent the actual AI agents that conduct the phone calls (e.g., calling two different Emergency Contacts simultaneously). Once the Voice Agents complete their calls, they post the call result data back to the Data Plane, making the information available to the original requester (the Call-Taker). Thus, the Voice Agents may follow a Participant lifecycle of: "waking up" (when spun up by VASDispatch), performing their task, posting their data, and then shutting down. The AI data flow 500 may describe a process for dynamically coordinating AI participants to gather and process medical information for efficient decision-making in emergency scenarios.

At 502, the incident context may include a medical profile. In some implementations, the medical profile may contain information about pre-existing conditions that a participant may have. The medical profile may include details about allergies that may affect the participant's treatment options. The medical profile may store information about recent medical procedures that the participant may have undergone. The medical profile may include a list of medications that the participant may currently be taking.

At 504, the incident context may include two emergency contacts. In some implementations, the emergency contacts may be individuals who may be notified in case of an incident involving the participant. The emergency contacts may have their phone numbers and email addresses stored within the incident context for immediate communication. The emergency contacts may be assigned specific roles, such as primary and secondary, to determine the order in which they may be contacted. The emergency contacts may be updated periodically to reflect changes in the participant's preferences or circumstances.

At 506, the incident context may request outbound information regarding whether medication has changed in the last 14 days for a specified individual. In some implementations, the request may be sent to a pharmacy participant connected to the data plane to determine recent prescription updates. The request may include the participant's unique identifier to ensure accurate retrieval of medication history. The request may be processed by an AI participant that may analyze the data for any discrepancies or updates. The request may trigger a notification to the participant's healthcare provider to confirm any changes in the medication list.

At 508, the vasdispatch may spin up two participants, the VAgent1 and the VAgent2. In some implementations, the vasdispatch may allocate computational resources to initialize VAgent1 and VAgent2 for specific tasks. The VASDispatch may assign unique identifiers to VAgent1 and VAgent2 to track their activities on the data plane. The vasdispatch may configure VAgent1 and VAgent2 with the necessary permissions to access relevant data. The VASDispatch may determine the roles of VAgent1 and VAgent2 based on the requirements of the emergency scenario.

At 510, the VAgent1 and the VAgent2 may initiate calls and subsequently post call result data. In some implementations, the calls initiated by VAgent1 and VAgent2 may connect to the emergency contacts identified in the incident context. The call result data may include timestamps indicating when the calls were initiated and completed. The call result data may contain information about whether the emergency contacts were successfully reached. The call result data may be posted to the data plane for access by other participants involved in the emergency response.

Figure 6:
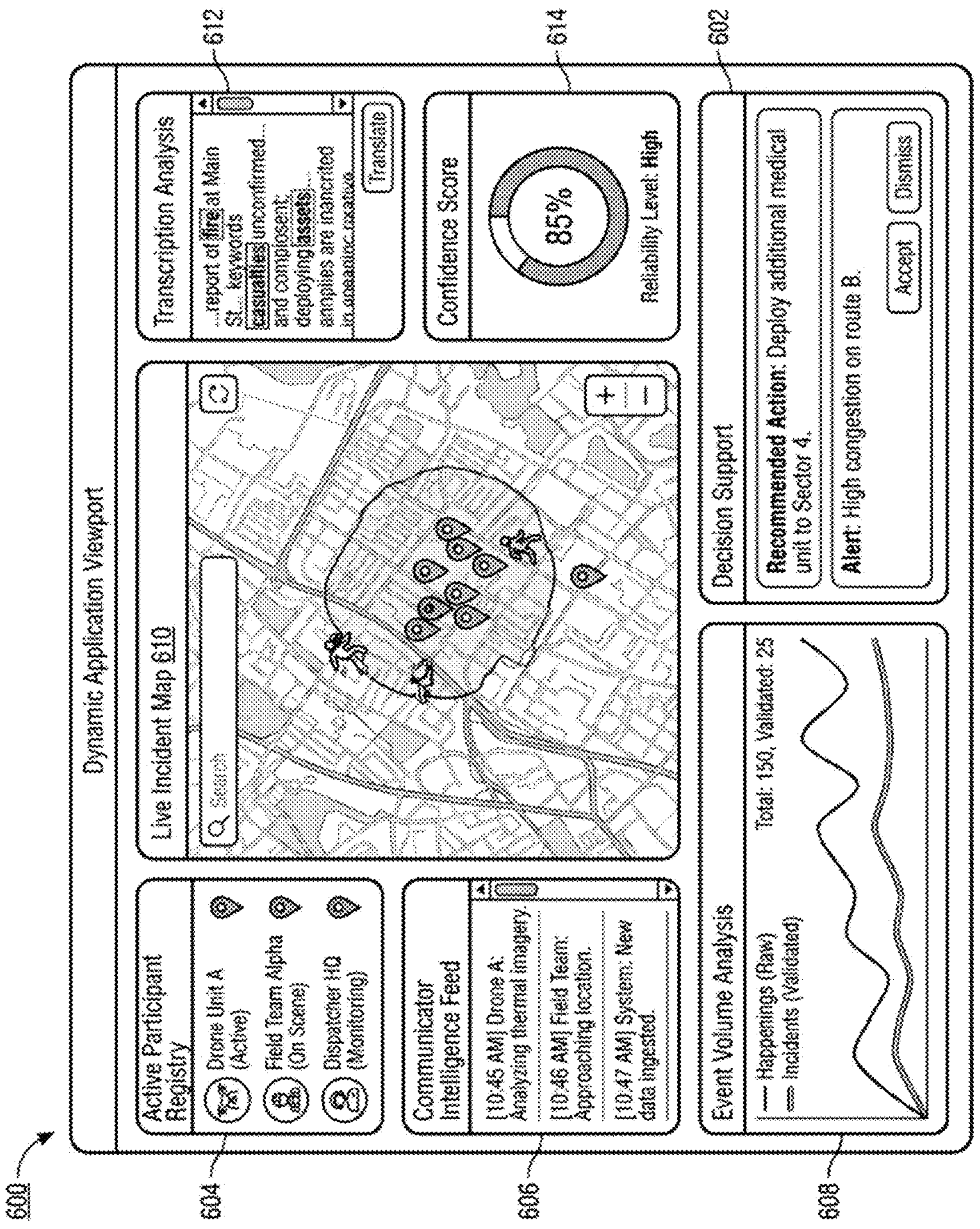
FIG. 6 shows a modular interface design which supports techniques for assembling tailored emergency response solutions with AI-driven modular architecture and a decentralized data plane in accordance with various aspects of the present disclosure.

FIG. 6 shows modular interface design 600 which supports techniques for assembling tailored emergency response solutions with AI-driven modular architecture and decentralized data plane in accordance with various aspects of the present disclosure. As depicted in FIG. 6, the modular interface design 600 may include one or more of Dynamic Application Viewport 200, Decision Support 602, Active Participant Registry 604, Communicator Intelligence Feed 606, Event Volume Analysis 608, Live Incident Map 610, Transcription Analysis 612, Confidence Score 614, and/or other components or widgets, which may also be referred to "Atomic Software Tools" selected by an AI model to fill an exemplary viewport shape.

The dynamic application viewport 200 may include mechanisms for rendering tailored emergency response interfaces based on modular configurations. In some implementations, the dynamic application viewport 200 may be the same as or similar to the application viewport 316, the standardized tool architecture 200, or the AI-augmented communication environment 300, as described herein.

The decision support 602 may represent tools for analyzing emergency scenarios and determining actionable insights. These tools may include algorithms or models that evaluate incoming data to identify potential courses of action. The decision support 602 may interact with the transcription analysis 612 to process audio-derived data and generate recommendations. In some implementations, the decision support 602 may integrate with the live incident map 610 to incorporate geospatial data into its analysis.

The active participant registry 604 may include a database for tracking entities involved in emergency response operations. This database may store information such as participant identities, roles, and geospatial parameters, such as geofences. The active participant registry 604 may interact with the communicator intelligence feed 606 to update participant statuses in real time. In some implementations, the active participant registry 604 may include mechanisms for querying participant capabilities and authorizations.

The communicator intelligence feed 606 may provide real-time updates and synthesized data from various emergency response sources. This feed may aggregate information from participants such as drones, sensors, and human operators. The communicator intelligence feed 606 may interact with the event volume analysis 608 to assess the frequency and scale of incidents. In some implementations, the communicator intelligence feed 606 may include mechanisms for filtering and prioritizing updates based on urgency.

The event volume analysis 608 may represent metrics for assessing the scale and frequency of emergency incidents. These metrics may visualize the ratio of ephemeral "happenings" (raw noise) to persistent "incidents" (validated threats). Furthermore, these metrics may include data on the number of incidents, their geographic distribution, and their temporal patterns. The event volume analysis 608 may interact with the live incident map 610 to visualize incident trends. In some implementations, the event volume analysis 608 may include tools for comparing historical and current incident data while also serving as a transparency tool to show the user how much noise is being filtered out by the system's validity logic.

The live incident map 610 may include geospatial data for visualizing ongoing emergency situations. This map may display the locations of incidents, participants, and resources. The live incident map 610 may interact with the transcription analysis 612 to annotate locations mentioned in audio inputs. In some implementations, the live incident map 610 may include layers for visualizing different types of incidents or resources.

The transcription analysis 612 may provide processed text data derived from audio inputs during emergency communications. This analysis may include features for identifying keywords, summarizing conversations, and tagging subjects. The transcription analysis 612 may interact with the confidence score 614 to evaluate the reliability of the processed text. In some implementations, the transcription analysis 612 may include tools for translating audio inputs into multiple languages.

The confidence score 614 may represent a metric for evaluating the reliability of data or insights generated within the system. This metric may be based on factors such as data source, processing method, and contextual consistency. The confidence score 614 may interact with the decision support 602 to prioritize actionable insights. In some implementations, the confidence score 614 may include visual indicators to communicate reliability levels to users. Furthermore, according to one embodiment, the confidence score 614 may serve as a triggering mechanism when determining whether a "happening" is promoted to incident.

In some implementations, the components shown in the image may be arranged within a modular and dynamic application viewport 200, which serves as the central interface for interaction. The decision support 602 may integrate data from various sources to assist participants in making informed choices, while the active participant registry 604 may maintain a real-time list of all entities currently engaged in the safety network. The communicator intelligence feed 606 may aggregate and display relevant updates or messages from participants, ensuring that critical information is accessible within the viewport.

In some implementations, the event volume analysis 608 may process and interpret data from the data plane to identify patterns or trends in reported happenings, which may then be visualized on the live incident map 610. The live incident map 610 may display geospatial data, including the locations of incidents and active participants, to support situational awareness. The transcription analysis 612 may process and analyze communication data, such as voice or text, to extract actionable insights, which may be associated with a confidence score 614 to indicate the reliability or significance of the information. These components may operate in coordination to present a cohesive and interactive experience within the dynamic application viewport 200, allowing participants to interact with the safety network effectively.

Figure 7:
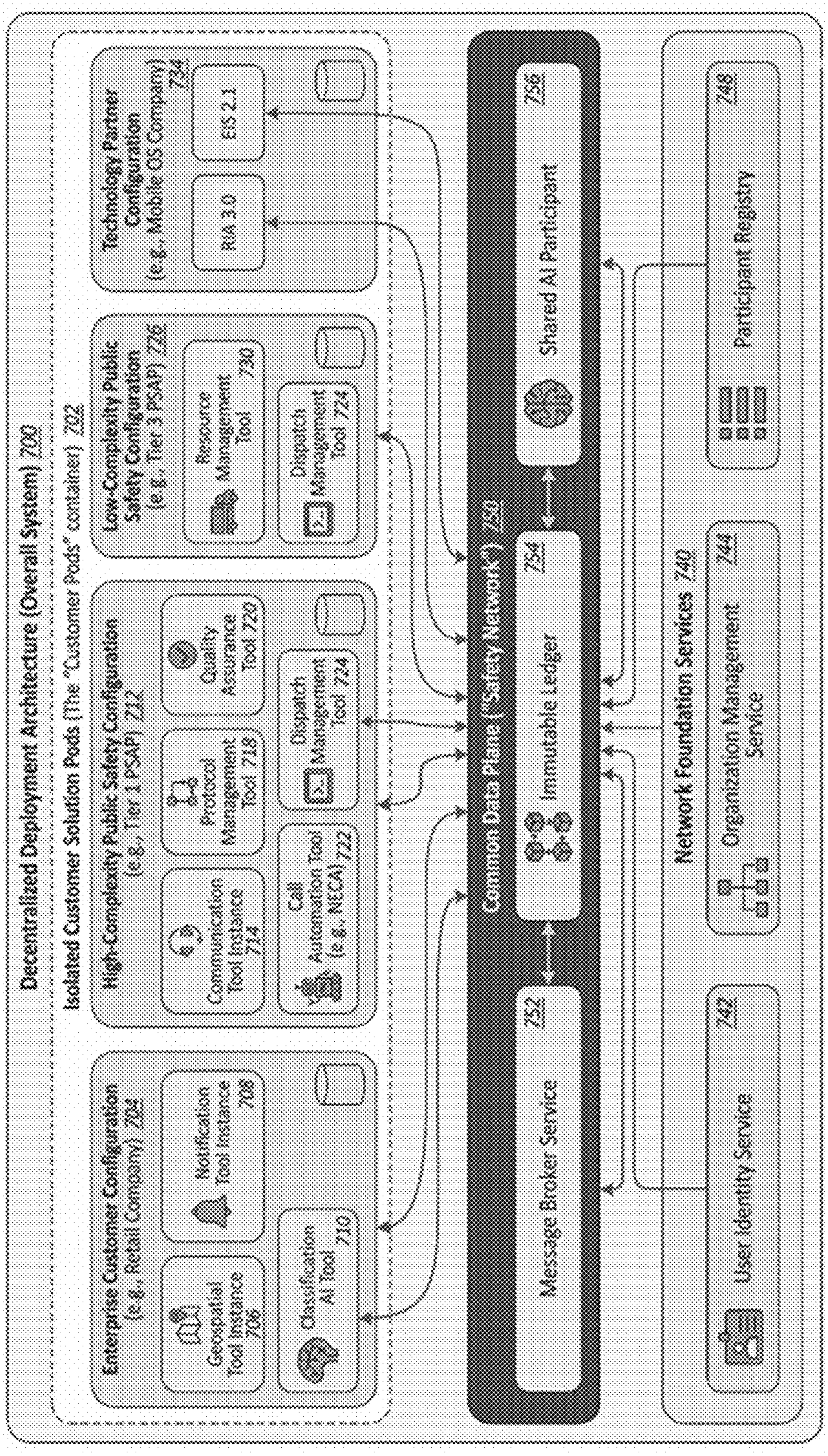
FIG. 7 shows a system architecture diagram which supports techniques for assembling tailored emergency response solutions with AI-driven modular architecture and a decentralized data plane in accordance with various aspects of the present disclosure.

FIG. 7 shows system architecture diagram 700 which supports techniques for assembling tailored emergency response solutions with AI-driven modular architecture and decentralized data plane in accordance with various aspects of the present disclosure. As depicted in FIG. 7, the system architecture diagram 700 may include one or more of: Decentralized Deployment Architecture (Overall System) 700, Isolated Customer Solution Pods (The “Customer Pods” container) 702, Enterprise Customer Configuration (e.g., Retail Company) 704, Geospatial Tool Instance 706, Notification Tool Instance 708, Classification AI Tool 710, High-Complexity Public Safety Configuration 712 (e.g., for Tier 1 PSAP), Communication Tool Instance 714, Protocol Management Tool 718, Quality Assurance Tool 720, Call Automation Tool (e.g., Non-Emergency Call Automation, or “NECA”) 722, Dispatch Management Tool 724, Low-Complexity Public Safety Configuration (e.g., Tier 3 PSAP) 726, Resource Management Tool 730, Technology Partner Configuration (e.g., Mobile OS Company) 734, Network Foundation Services 740, User Identity Service 742, Organization Management Service 744, Participant Registry 748, Common Data Plane 750, Message Broker Service 752, Immutable Ledger 754, Shared AI Participant 756, and/or other components.

The decentralized deployment architecture (overall system) 700 may include a modular framework for integrating various emergency response tools and services. This framework may allow for the seamless integration of multiple components, such as geospatial tools, communication tools, and protocol management tools, into a unified system. The decentralized deployment architecture (overall system) 700 may enable independent operation of customer-specific deployments while maintaining connectivity to a shared data plane. In some implementations, the architecture may support scalability by allowing the addition of new tools or services without disrupting existing configurations. For example, the architecture may accommodate the integration of a new AI-based classification tool to enhance data analysis capabilities.

The isolated customer solution pods (the “customer pods” container) 702 may represent independent deployments tailored to specific customer requirements. Each pod may correspond to a unique “Viewport Shape” generated by the AI solution assembler based on a multi-dimensional analysis of the customer’s operational needs. These pods may operate as self-contained units, each configured with a unique set of tools and services based on the customer’s operational needs. The isolated customer solution pods (the “customer pods” container) 702 may include features such as localized data storage and customer-specific AI agents. In some implementations, these pods may interact with the common data plane 750 (e.g., safety network) to exchange information with other participants. For instance, a customer pod for a retail company may include tools for incident management and resource allocation tailored to the retail environment.

The enterprise customer configuration (e.g., retail company) 704 may include tools and services customized for large-scale enterprise operations, such as those managed by a GSOC. In this context, a GSOC may serve as a centralized command and control facility responsible for detecting, analyzing, and responding to security incidents across an organization’s global footprint. This configuration may support features such as geospatial mapping, notification systems, and resource management tailored to the needs of enterprise customers. The enterprise customer configuration (e.g., retail company) 704 may integrate with the participant registry 748 to register and manage enterprise-specific participants and their capabilities. In some implementations, this configuration may include AI-driven tools for analyzing customer-specific data, such as sales trends or security incidents. For example, a retail company may use this configuration to monitor emergency calls originating from its locations.

The geospatial tool instance 706 may provide geospatial data and mapping functionalities for emergency response scenarios. This tool may include capabilities for visualizing incident locations, tracking participant movements, and defining geospatial parameters, such as geofences. The geospatial tool instance 706 may interact with the common data plane 750 to access real-time location data from various participants. In some implementations, this tool may support integration with external mapping services to enhance its geospatial capabilities. For example, the tool may display the locations of ambulances and fire trucks in relation to an ongoing incident.

The notification tool instance 708 may include capabilities for sending alerts and notifications to relevant participants. This tool may support various communication channels, such as SMS, email, and in-app notifications, to ensure timely dissemination of critical information. The notification tool instance 708 may utilize the message broker service 752 to distribute notifications to targeted participants based on predefined criteria. In some implementations, this tool may include customizable templates for different types of notifications, such as evacuation alerts or resource requests. For instance, the tool may send a notification to nearby responders about a newly reported incident.

The classification AI tool 710 may include artificial intelligence capabilities for categorizing and analyzing incoming data. This tool may process data from various sources, such as transcriptions, images, and sensor readings, to identify patterns and classify incidents. The classification AI tool 710 may interact with the immutable ledger 754 to access historical data for training and validation purposes. In some implementations, this tool may support real-time classification of incidents to assist in decision-making. For example, the tool may classify an incoming call as a medical emergency based on keywords detected in the transcription.

The high-complexity public safety configuration (e.g., tier 1 PSAP) 712 may represent a setup designed to handle advanced public safety operations. This configuration may include tools for incident management, protocol execution, and resource allocation tailored to high-demand environments. The high-complexity public safety configuration (e.g., tier 1 PSAP) 712 may integrate with the network foundation services 740 to manage user authentication and organizational hierarchies. In some implementations, this configuration may support advanced analytics for monitoring call volumes and response times. For instance, a tier 1

PSAP may use this configuration to coordinate multi-agency responses to large-scale emergencies.

The communication tool instance 714 may include features for facilitating communication between participants in the safety network. This tool may support functionalities such as voice calls, text messaging, and video conferencing to enable real-time collaboration. The communication tool instance 714 may interact with the message broker service 752 to route communication data to the appropriate participants. In some implementations, this tool may include AI-driven features for transcription and translation to support multilingual communication. For example, the tool may transcribe and translate a 911 call in real-time for a dispatcher.

The protocol management tool 718 may include functionalities for managing and executing predefined response protocols. This tool may allow users to define, modify, and activate protocols based on specific incident types and scenarios. The protocol management tool 718 may interact with the immutable ledger 754 to log protocol activations and updates for audit purposes. In some implementations, this tool may integrate with AI participants to automate protocol execution and monitoring. For instance, the tool may activate a fire evacuation protocol based on data from smoke detectors and other sensors.

The quality assurance tool 720 may include mechanisms for monitoring and assessing the quality of emergency response processes. This tool may support features such as call reviews, performance metrics, and compliance checks to ensure adherence to established standards. The quality assurance tool 720 may utilize the common data plane 750 to access relevant data for quality assessments. In some implementations, this tool may include AI-driven analytics to identify trends and areas for improvement. For example, the tool may analyze call recordings to evaluate dispatcher performance.

The call automation tool 722 may include features for automating non-emergency call handling and routing. This tool may support functionalities such as automated responses, call triaging, and routing to appropriate departments. The call automation tool 722 may interact with the participant registry 748 to identify and route calls to the relevant participants. In some implementations, this tool may include AI-driven features for understanding caller intent and providing appropriate responses. For instance, the tool may automatically route a non-emergency call to a local utility company.

The dispatch management tool 724 may include functionalities for coordinating and managing dispatch operations. This tool may support features such as resource allocation, route optimization, and real-time tracking of dispatched units. The dispatch management tool 724 may utilize the geospatial tool instance 706 to display the locations of dispatched units on a map. In some implementations, this tool may include AI-driven capabilities for predicting response times and identifying the nearest available resources. For example, the tool may recommend the closest ambulance to respond to an incident.

The low-complexity public safety configuration (e.g., tier 3 PSAP) 726 may represent a setup designed for basic public safety operations. This configuration may include essential tools for call handling, incident reporting, and basic resource management. The low-complexity public safety configuration (e.g., tier 3 PSAP) 726 may integrate with the user identity service 742 to manage access for call takers and dispatchers. In some implementations, this configuration may support simplified workflows for smaller public safety agencies. For instance, a tier 3 PSAP may use this configuration to handle routine emergency calls in a rural area.

The resource management tool 730 may include capabilities for tracking and allocating resources during emergency response activities. This tool may support features such as inventory management, resource scheduling, and usage tracking. The resource management tool 730 may interact with the organization management service 744 to manage resources across multiple organizational units. In some implementations, this tool may include AI-driven analytics for predicting resource needs based on historical data. For example, the tool may allocate fire trucks and personnel to high-risk areas during wildfire season.

The technology partner configuration 734 (e.g., mobile OS company) may include tools and services tailored for integration with technology partners. This configuration may support features such as API integrations, data sharing, and co-branded user interfaces. The technology partner configuration 734 (e.g., mobile OS company) may utilize the participant registry 748 to register and manage technology partner participants. In some implementations, this configuration may include tools for monitoring and analyzing user interactions with partner applications. For instance, a mobile OS company may use this configuration to integrate emergency response features into its operating system.

The network foundation services 740 may include core services required for the operation and management of the safety network. In some implementations, the network foundation services 740 may be the same as or similar to the network foundation services 740, as described herein.

The user identity service 742 may include mechanisms for managing user authentication and identity verification. In some implementations, the user identity service 742 may be the same as or similar to the user identity service 742, as described herein.

The organization management service 744 may include functionalities for managing organizational structures and hierarchies within the safety network. In some implementations, the organization management service 744 may be the same as or similar to the organization management service 744, as described herein.

The participant registry 748 may include a database for registering and discovering participants and their capabilities. In some implementations, the participant registry 748 may be the same as or similar to the active participant registry 604, as described herein. Furthermore, the participant registry 748 may store authorization profiles and capability definitions that allow recipient nodes to independently validate requests, thereby enabling the decentralized zero-trust protocol.

The common data plane ("safety network") 750 may represent a unified platform for data exchange and communication among participants. In some implementations, the common data plane 750 ("safety network") may be the same as or similar to the common data plane 314, as described herein.

The message broker service 752 may include functionalities for distributing messages and data to relevant participants. In some implementations, the message broker service 752 may be the same as or similar to the communicator intelligence feed 606, as described herein.

The immutable ledger 754 may include a secure and unalterable record of all transactions and events within the safety network. In some implementations, the immutable ledger 754 may be the same as or similar to the ledger component described in the Harmony & the Data Plane disclosure.

The shared AI participant 756 may represent an artificial intelligence entity capable of interacting with multiple components of the safety network. In some implementations, the shared AI participant 756 may be the same as or similar to the protocol AI participant 308, as described herein, capable of running one or more generative AI models. According to some embodiments, the shared AI participant 756 functions as an "Intelligence Generator" responsible for executing the validity logic that promotes ephemeral "Happenings" to persistent "Incidents," effectively filtering noise from the network.

In some implementations, the decentralized deployment architecture 700 may serve as the overarching framework connecting isolated customer solution pods 702, which may include configurations tailored to enterprise customers 704, high-complexity public safety setups 712, low-complexity public safety setups 726, and configurations for the technology partner 734. Each customer pod 702 may interact with the common data plane 750, which may act as the central repository for immutable posts managed by the ledger 754 and coordinated through the message broker service 752. Shared AI participants 756 may operate within the common data plane 750 to process events and execute tasks across the network.

In some implementations, enterprise customer configurations 704 may include geospatial tool instances 706, notification tool instances 708, and classification AI tools 710, which may connect to the safety network, or common data plane 750, for data exchange and coordination. High-complexity public safety configurations 712 may incorporate communication tool instances 714, protocol management tools 718, quality assurance tools 720, call automation tools 722, and dispatch management tools 724, which may interact with the ledger 754 to maintain traceability and auditability of operations. Low-complexity public safety configurations 726 may include resource management tools 730 and dispatch management tools 724, which may rely on the message broker service 752 for real-time notifications and updates.

In some implementations, network foundation services 740 may include user identity services 742, organization management services 744, and participant registry services 748, which may define roles, capabilities, and authorization profiles for participants interacting with the common data plane 750. Technology partner configurations 734 may integrate tools such as RIA 3.0 and EIS 2.1, which may connect to the common data plane 750 to contribute specialized functionalities. Shared AI participants 756 may continuously monitor data streams from the message broker service 752, reacting to events and executing tasks such as classification, summarization, and anomaly detection. By decoupling the customer pods 702 from the shared AI participants 756, the architecture allows for individual customers to receive bespoke, version-specific tool configurations without fragmenting the underlying data network.

Figure 8:
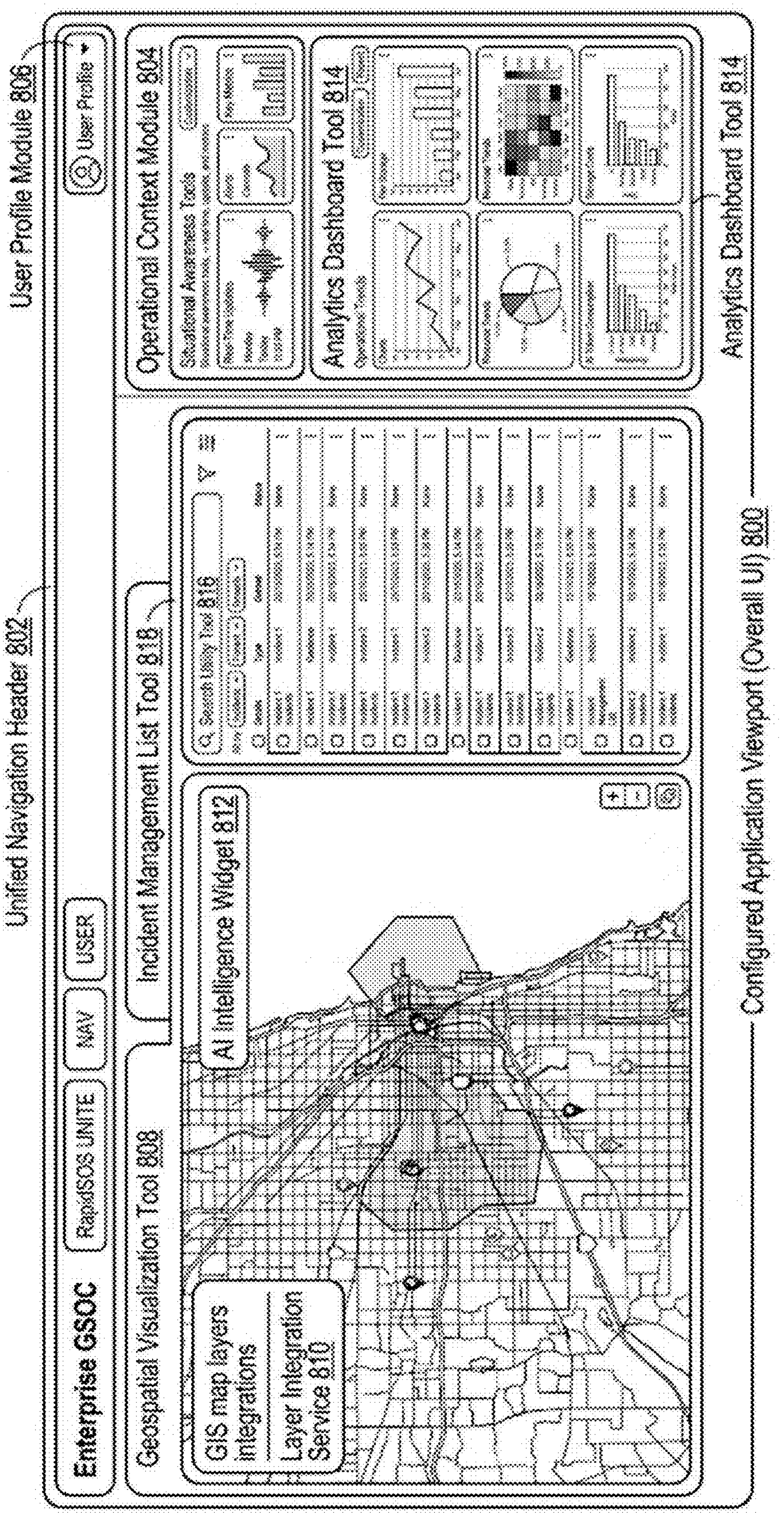
FIG. 8 shows a dashboard interface design which supports techniques for assembling tailored emergency response solutions with AI-driven modular architecture and a decentralized data plane in accordance with various aspects of the present disclosure.

FIG. 8 shows a dashboard interface design for a configured application viewport 800 which supports techniques for assembling tailored emergency response solutions with AI-driven modular architecture and decentralized data plane in accordance with various aspects of the present disclosure. As depicted in FIG. 8, the configured application viewport 800 or Configured Application Viewport (Overall UI) may include one or more a Unified Navigation Header 802, an Operational Context Module 804, a User Profile Module 806, a Geospatial Visualization Tool 808, a Layer Integration Service 810, an AI Intelligence Widget 812, an Analytics Dashboard Tool 814, a Search Utility Tool 816, an Incident Management List Tool 818, and/or other components.

The configured application viewport 800 may include an interface representing a unique user interface generated by the AI solution assembler to fulfill specific user operational shapes for assembling emergency response solutions. For example, the viewport may be configured for a GSOC analyst requiring high geospatial awareness, prioritizing map-based tools over list-based tools to monitor assets within a geofence, such as an Enterprise GSOC, a Distributed Operations Command Center, Corporate Security Monitor System, etc. Unlike static dashboards, the configured application viewport 800 may include a dynamic interface that adapts to the specific needs of users based on their roles and operational requirements. The configured application viewport 800 may include interactive elements that allow users to interact with various tools and modules seamlessly. The configured application viewport 800 may interact with the unified navigation header 802 to maintain a consistent user experience across different modules. In some implementations, the configured application viewport 800 may include alternative layouts or themes to accommodate different user preferences or accessibility needs.

The unified navigation header 802 may include a consistent navigation element across various modules. The unified navigation header 802 may include dropdown menus, quick access buttons, and search functionality to streamline navigation. The unified navigation header 802 may include branding elements, such as logos and color schemes, to align with organizational identity. The unified navigation header 802 may interact with the operational context module 804 to display context-specific navigation options. In some implementations, the unified navigation header 802 may include customizable shortcuts for frequently accessed tools or features.

The operational context module 804 may include tools for situational awareness and operational control. The operational context module 804 may include features such as real-time updates, alerts, and notifications to keep users informed. The operational context module 804 may include interactive dashboards that display key metrics and operational data. The operational context module 804 may interact with the geospatial visualization tool 808 to display location-based information. In some implementations, the operational context module 804 may include alternative configurations to support different operational scenarios.

The user profile module 806 may include user-specific information and settings. The user profile module 806 may include options for managing user credentials, roles, and permissions. The user profile module 806 may include a history of user activity and preferences to personalize the user experience. The user profile module 806 may interact with the analytics dashboard tool 814 to display user-specific performance metrics. In some implementations, the user profile module 806 may include support for multi-factor authentication to enhance security.

The geospatial visualization tool 808 may include interactive mapping capabilities for visualizing spatial data. The geospatial visualization tool 808 may include features such as zooming, panning, and layer toggling to explore geospatial information. The geospatial visualization tool 808 may include markers and annotations to highlight specific locations or incidents. The geospatial visualization tool 808 may interact with the layer integration service 810 to display additional geospatial data, overlaying real-time "Happening" and "Incident" objects from the data plane onto the map. In some implementations, the geospatial visualization tool 808 may include support for 3D visualization to enhance spatial understanding.

The layer integration service 810 may include support for integrating geospatial data layers. The layer integration service 810 may include options for importing and managing external GIS data sources. The layer integration service 810 may include tools for customizing the appearance and visibility of individual layers. The layer integration service 810 may interact with the AI intelligence widget 812 to overlay AI-driven insights on the map. In some implementations, the layer integration service 810 may include support for real-time data feeds to display dynamic geospatial information.

The AI intelligence widget 812 may include AI-driven insights and recommendations and may serve as a direct interface to the Shared AI Participants on the network. The AI intelligence widget 812 may include predictive analytics to anticipate potential incidents or operational needs. The AI intelligence widget 812 may include natural language processing capabilities to interpret and respond to user queries. The AI intelligence widget 812 may interact with the search utility tool 816 to refine and prioritize search results. In some implementations, the AI intelligence widget 812 may include alternative AI models to address specific operational contexts.

The analytics dashboard tool 814 may include features for analyzing operational data and metrics. The analytics dashboard tool 814 may include visualizations such as charts, graphs, and heatmaps to represent data trends. The analytics dashboard tool 814 may include options for exporting data and generating reports. The analytics dashboard tool 814 may interact with the incident management list tool 818 to analyze incident trends and patterns. In some implementations, the analytics dashboard tool 814 may include customizable widgets to tailor the dashboard to specific user needs. Furthermore, this analytics dashboard tool 814 may visualize the resource consumption profile (e.g., AI token usage, storage costs) of the active solution, providing transparency into the cost estimation calculated during the assembly phase.

The search utility tool 816 may include functionality for querying and retrieving relevant information. The search utility tool 816 may include advanced filtering and sorting options to refine search results. The search utility tool 816 may include support for keyword-based and natural language queries. The search utility tool 816 may interact with the operational context module 804 to display search results in the appropriate context. In some implementations, the search utility tool 816 may include support for saving and sharing search queries for future use.

The incident management list tool 818 may include a structured list of ongoing and past incidents. In some implementations, the incident management list tool 818 may be the same as or similar to the protocol management tool 718, the live incident map 610, or the transcription analysis 612, as described herein.

In some implementations, the Configured Application Viewport 800 may serve as the overarching user interface, integrating multiple modules to create a cohesive operational environment. The Unified Navigation Header 802 may be positioned at the top of the viewport, offering a consistent entry point for accessing various functionalities across the platform. The Operational Context Module 804 may be situated adjacent to the navigation header, potentially displaying contextual information relevant to the user's current tasks or operational focus. The User Profile Module 806 may be located alongside the navigation header, allowing participants to manage their credentials and access permissions.

In some implementations, the Geospatial Visualization Tool 808 may occupy a central area within the viewport, displaying spatial data that may be layered through the Layer Integration Service 810. The AI Intelligence Widget 812 may overlay specific sections of the viewport, potentially interacting with other modules to deliver insights or recommendations based on real-time data. The Analytics Dashboard Tool 814 may be arranged in a dedicated panel, presenting visualized metrics and trends that may assist participants in monitoring operational performance. The Search Utility Tool 816 may be integrated into the viewport to allow participants to locate specific data or incidents, which may be displayed in the Incident Management List Tool 818 for further review and coordination, thereby demonstrating the flexibility of the AI-driven assembly process.

Figure 9:
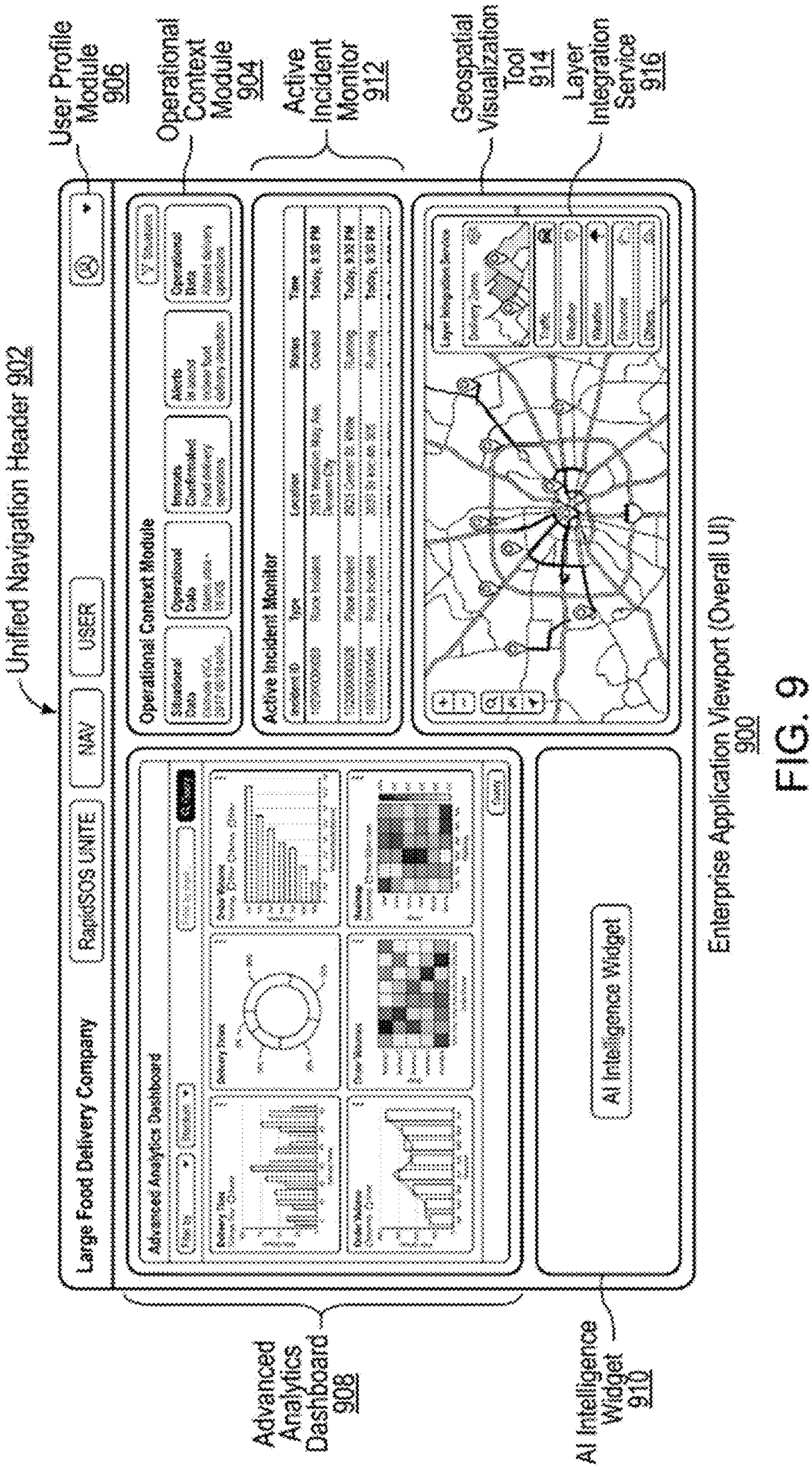
FIG. 9 shows a dashboard layout overview which supports techniques for assembling tailored emergency response solutions with AI-driven modular architecture and a decentralized data plane in accordance with various aspects of the present disclosure.

FIG. 9 shows a dashboard layout overview for the enterprise application viewport 900 which supports techniques for assembling tailored emergency response solutions with AI-driven modular architecture and decentralized data plane in accordance with various aspects of the present disclosure. As depicted in FIG. 9, the enterprise application viewport 900 may include one or more of Enterprise Application Viewport (Overall UI) for the enterprise application viewport 900, Unified Navigation Header 902, Operational Context Module 904, User Profile Module 906, Advanced Analytics Dashboard 908, AI Intelligence Widget 910, Active Incident Monitor 912, Geospatial Visualization Tool 914, Layer Integration Service 916, and/or other components.

The enterprise application viewport 900 may include a comprehensive interface for interacting with various emergency response tools and modules. This interface may be designed to integrate multiple functionalities into a single, cohesive platform, allowing users to access and manage different components seamlessly. The enterprise application viewport 900 may include features such as real-time data visualization, interactive dashboards, and customizable layouts tailored to specific user roles. The enterprise application viewport 900 may interact with other components, such as the unified navigation header 902 and the operational context module 904, to ensure a consistent user experience. In some implementations, the enterprise application viewport 900 may include alternatives like modular interfaces or role-specific dashboards to cater to diverse user needs.

According to one embodiment, the enterprise application viewport 900 may represent a specialized configuration generated by the AI solution assembler for large-scale logistics operations (e.g., a "Large Food Delivery Company"). Unlike the dispatch-centric layouts of FIG. 8, this exemplary enterprise application viewport 900 may be constructed based on a "Viewport Shape" that prioritizes data consolidation and macro-level decision support. Consequently, the AI has selected and resized the atomic tools to feature a dominant analytics interface, illustrating the system's ability to adapt to diverse operational intents without manual coding.

The unified navigation header 902 may include a consistent navigation element to access different functionalities within the platform. In some implementations, the unified navigation header 902 may be the same as or similar to the unified navigation header 802, as described herein.

The operational context module 904 may include features to display relevant operational information for users. In some implementations, the operational context module 904 may be the same as or similar to the operational context module 804, as described herein.

The user profile module 906 may include user-specific settings and account details. In some implementations, the user profile module 906 may be the same as or similar to the user profile module 806, as described herein.

The advanced analytics dashboard 908 may include tools for analyzing data and generating insights related to emergency response activities. This dashboard may support various data visualization techniques, such as charts, graphs, and heatmaps, to represent complex datasets in an accessible manner. The advanced analytics dashboard 908 may include capabilities to filter, sort, and query data based on user-defined parameters. The advanced analytics dashboard 908 may interact with the geospatial visualization tool 914 to incorporate location-based analytics into its visualizations. In some implementations, the advanced analytics dashboard 908 may include alternatives like simplified reporting tools or specialized modules for specific analytics tasks.

The AI intelligence widget 910 may include AI-driven functionalities to process and interpret data within the safety network. In some implementations, the AI intelligence widget 910 may be the same as or similar to the AI intelligence widget 812, as described herein.

The active incident monitor 912 may include real-time tracking and updates of ongoing incidents. This active incident monitor 912 may display incident details such as location, status, and involved participants, enabling users to stay informed about critical developments. According to one embodiment, the active incident monitor 912 may only display those data objects that have been "promoted" from the ephemeral "Happening" state to the persistent "Incident" state based on the system's validity logic. This ensures that the high-volume enterprise user is not overwhelmed by raw sensor noise. The active incident monitor 912 may include features to categorize incidents based on priority, type, or geographic area. The active incident monitor 912 may interact with the geospatial visualization tool 914 to provide a visual representation of incident locations. In some implementations, the active incident monitor 912 may include alternatives like incident summary lists or timeline-based visualizations.

The geospatial visualization tool 914 may include interactive mapping capabilities for situational awareness. In some implementations, the geospatial visualization tool 914 may be the same as or similar to the geospatial visualization tool 808, as described herein.

The layer integration service 916 may include support for integrating geospatial data layers into the mapping interface. In some implementations, the layer integration service 916 may be the same as or similar to the layer integration service 810, as described herein.

In some implementations, the enterprise application viewport 900 may serve as the overarching user interface, integrating multiple modules to create a cohesive operational environment. The Unified Navigation Header 902 may act as a persistent element across the viewport, allowing participants to access various functionalities such as the Operational Context Module 904 and the User Profile Module 906. The Operational Context Module 904 may dynamically display relevant situational data based on the participant's role and permissions, while the User Profile Module 906 may manage participant-specific settings and credentials.

In some implementations, the Advanced Analytics Dashboard 908 may interact with the AI Intelligence Widget 910 to process and visualize data streams from the Active Incident Monitor 912. The Active Incident Monitor 912 may track incidents promoted from happenings, presenting them in a structured timeline for participant coordination. The Geospatial Visualization Tool 914 may render spatial data, which may be enhanced by the Layer Integration Service 916 to incorporate GIS map layers for detailed geographic context. These components may operate in tandem to allow participants to interact with the data plane through the viewport, with AI agents potentially orchestrating real-time updates across modules.

Figure 10:
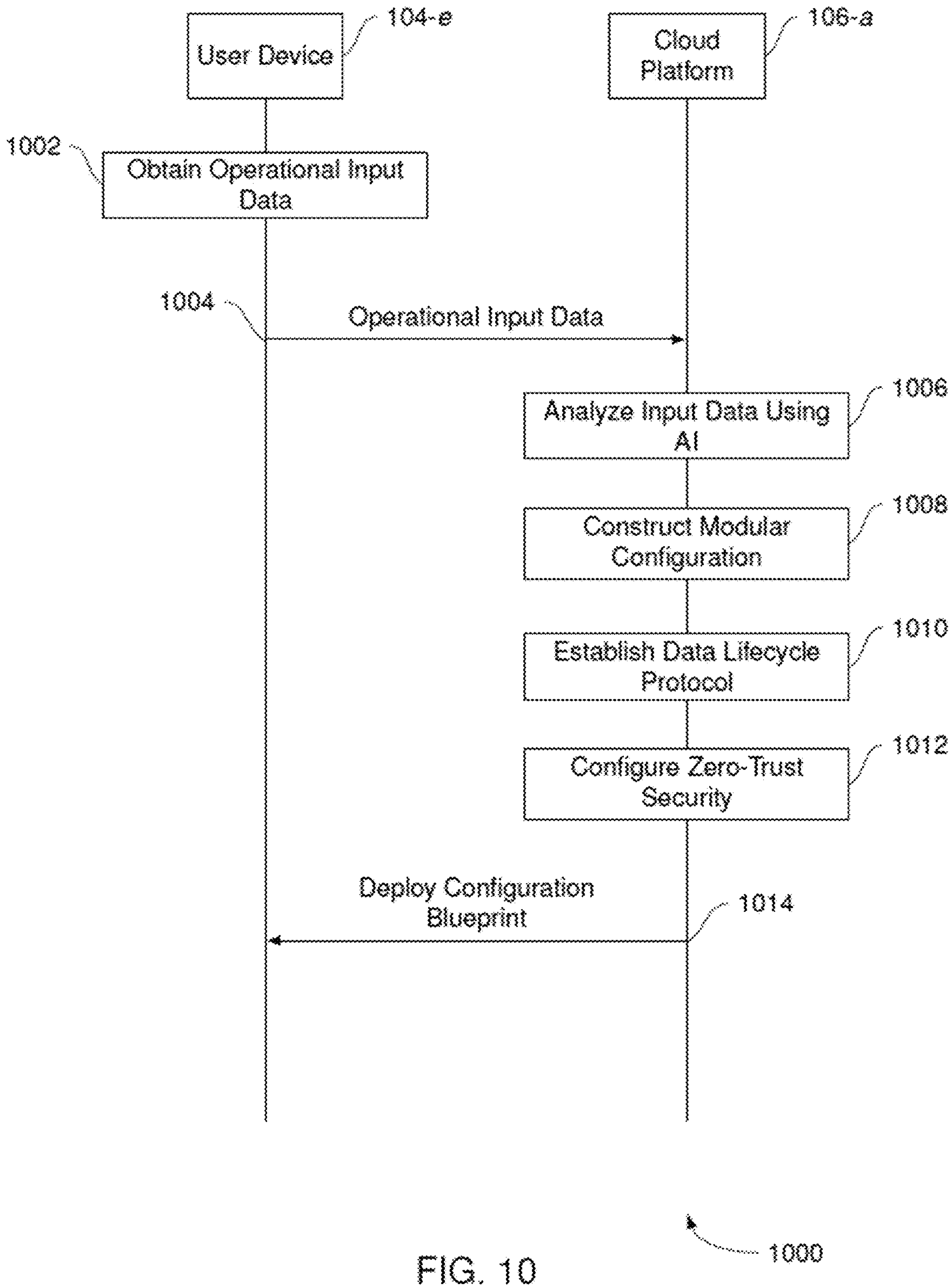
FIG. 10 illustrates an example of a process flow that supports assembling tailored emergency response solutions with AI-driven modular architecture and a decentralized data plane in accordance with various aspects of the present disclosure.

FIG. 10 illustrates an example of a process flow 1000 that supports assembling tailored emergency response solutions with AI-driven modular architecture and decentralized data plane in accordance with aspects of the present disclosure. In some examples, the process flow 1000 may implement aspects of the system 100. For example, the process flow 1000 may include a user device 104-*e* and a cloud platform 106-*a*, which may be examples of corresponding devices described herein. In some implementations, a user device 104-*e* transmits operational input data defining emergency response requirements to a cloud platform 106-*a*, which utilizes a generative AI model to analyze the data, identify atomic software tools, construct a modular configuration blueprint, establish a data lifecycle management protocol within a decentralized data plane, configure a zero-trust security framework, and deploy the blueprint to a designated network endpoint for execution.

At 1002, the user device 104-*e* may obtain operational input data defining emergency response requirements for an entity. For example, the user device 104-*e* may receive input data specifying the geofence boundaries and operational capabilities of the entity, such as the ability to dispatch fire trucks or drones. In some implementations, the user device 104-*e* may obtain data related to the entity's authorization profiles, including access permissions for specific emergency response tools or systems. The user device 104-*e* may further acquire information about the entity's preferred communication protocols, such as voice, text, or video streams, to align with its operational needs.

At 1004, the user device 104-*e* may transmit the operational input data to the cloud platform 106-*a*. For example, the user device 104-*e* may send data specifying the entity's geofence boundaries and operational capabilities, such as the ability to deploy ambulances or activate fire sensors. In some implementations, the user device 104-*e* may transmit information about the entity's preferred communication protocols, including configurations for voice or video streams. The user device 104-*e* may further relay data related to the entity's authorization profiles, such as permissions for accessing specific emergency response tools or systems.

At 1006, the cloud platform 106-*a* may analyze the operational input data using a generative artificial intelligence (AI) model to determine a required solution shape and identify a plurality of atomic software tools from a tool library to fulfill the required solution shape, each atomic software tool associated with a semantic interface layer specifying its functional attributes and data dependencies. For example, the cloud platform 106-*a* may determine that the required solution shape includes tools for geospatial mapping, transcription, and incident management, and may select corresponding atomic software tools with predefined semantic interface layers for these functionalities. In some implementations, the cloud platform 106-*a* may identify atomic software tools that broadcast their resource usage patterns, such as computational or storage requirements, to align with the operational input data. In other implementations, the cloud platform 106-*a* may prioritize atomic software tools that include assembly guidance metadata, such as visual design representations or input/output constraints, to ensure compatibility with the required solution shape.

At 1008, the cloud platform 106-*a* may construct a modular configuration blueprint that specifies logical relationships among the identified atomic software tools and their integration with a decentralized data plane. For example, the cloud platform 106-*a* may determine that a geospatial mapping tool may need to interface with a transcription tool to annotate incident locations with real-time audio data. In some implementations, the modular configuration blueprint may include specifications for synchronizing a resource allocation tool with a participant registry to dynamically assign tasks based on the capabilities of available participants. The cloud platform 106-*a* may further define how a protocol management tool may interact with an incident timeline to track and update procedural adherence in response to evolving conditions.

At 1010, the cloud platform 106-*a* may establish a data lifecycle management protocol within the decentralized data plane to classify and manage information as ephemeral or persistent based on predefined criteria. For example, the cloud platform 106-*a* may determine that video streams from security cameras are ephemeral and should be retained for a limited duration, while incident reports containing critical intelligence may be classified as persistent for long-term storage. In some implementations, the cloud platform 106-*a* may assign specific tags to each data type, such as "transient" for short-lived telemetry or "archival" for compliance-related documents, to facilitate their classification. The cloud platform 106-*a* may further define retention policies for ephemeral data, such as automatic deletion after a specified time, and may configure persistent data to be indexed for future retrieval.

At 1012, the cloud platform 106-*a* may configure a zero-trust security framework to govern data access and interactions among participants and the decentralized data plane. For example, the cloud platform 106-*a* may establish participant-specific authorization policies to restrict access to sensitive data based on predefined roles and capabilities. In some implementations, the cloud platform 106-*a* may integrate a ledger service to log all access requests and interactions, enabling traceability and auditability of data exchanges. The cloud platform 106-*a* may further define encryption protocols for data in transit and at rest, ensuring that participants may securely exchange information without exposing it to unauthorized entities.

At 1014, the cloud platform 106-*a* may deploy the modular configuration blueprint to a designated network endpoint for execution. For example, the cloud platform 106-*a* may deploy the blueprint to a network endpoint associated with a specific emergency response organization, ensuring that the deployed configuration aligns with the organization's operational requirements. In some implementations, the deployment may involve transferring the blueprint to a secure cloud-based server that may host the necessary tools and services for the solution. The cloud platform 106-*a* may deploy the blueprint to multiple network endpoints simultaneously, such as endpoints located in different geographic regions, to support distributed operations.

Figure 11:
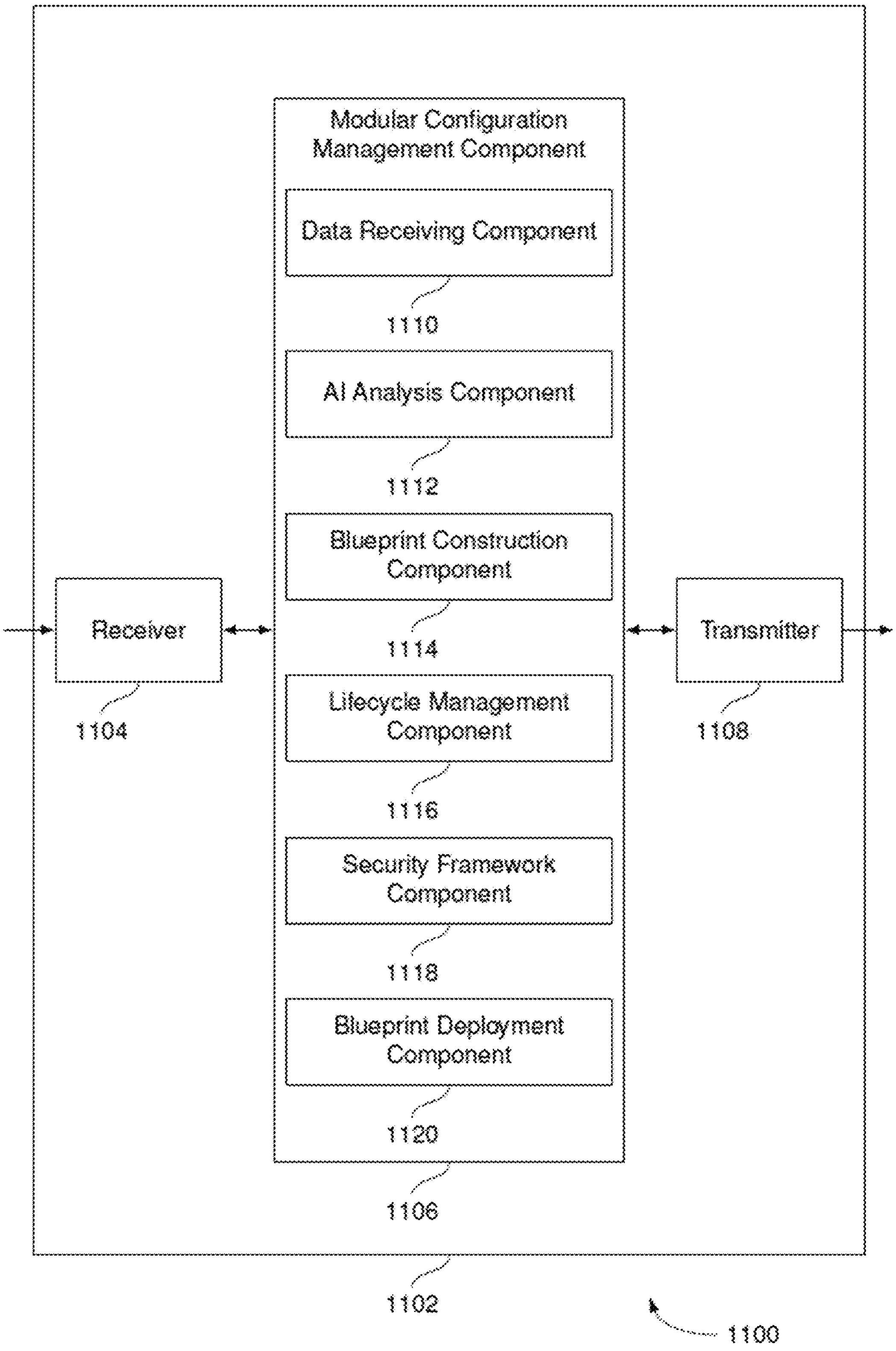
FIG. 11 shows a block diagram of an apparatus that supports assembling tailored emergency response solutions with AI-driven modular architecture and a decentralized data plane in accordance with various aspects of the present disclosure.

FIG. 11 shows a block diagram 1100 of an apparatus 1102 that supports assembling tailored emergency response solutions with AI-driven modular architecture and decentralized data plane in accordance with various aspects of the present disclosure. The apparatus 1102 may include an input module 1104, modular configuration management component 1106, and an output module 1108. The apparatus 1102 may also include a processor. Each of these components may be in communication with one another (e.g., via one or more buses). In some cases, the apparatus 1102 may be an example of a user terminal, a database server, or a system containing multiple computing devices.

The input module 1104 may manage input signals for the apparatus 1102. For example, the input module 1104 may identify input signals based on an interaction with a modem, a keyboard, a mouse, a touchscreen, or a similar device. These input signals may be associated with user input or processing at other components or devices. In some cases, the input module 1104 may utilize an operating system such as iOS®, ANDROID®, MS-DOS®, MS-WINDOWS®, OS/2®, UNIX®, LINUX®, or another known operating system to handle input signals. The input module 1104 may send aspects of these input signals to other components of the apparatus 1102 for processing. In some cases, the input module 1104 may be a component of an input/output (I/O) controller 1306 as described with reference to FIG. 13.

The modular configuration management component 1106 may include one or more of a data receiving component 1110, an AI analysis component 1112, a blueprint construction component 1114, a lifecycle management component 1116, a security framework component 1118, a blueprint deployment component 1120, and/or other components. The modular configuration management component 1106 may be an example of aspects of the modular configuration management component 1202 or 1304 described with reference to FIGS. 12 and 13.

The data receiving component 1110 may be configured as or otherwise support a means for receiving, at a server, operational input data defining emergency response requirements for an entity. The AI analysis component 1112 may be configured as or otherwise support a means for analyzing, by a generative AI model, the operational input data to calculate a required solution shape and identifying a plurality of atomic software tools from a tool library to fulfill the required solution shape, each atomic software tool associated with a semantic interface layer specifying its functional attributes and data dependencies. The blueprint construction component 1114 may be configured as or otherwise support a means for constructing, by the server, a modular configuration blueprint that specifies logical relationships among the identified atomic software tools and their integration with a decentralized data plane. The lifecycle management component 1116 may be configured as or otherwise support a means for establishing, by the server, a data lifecycle management protocol within the decentralized data plane to classify and manage information as ephemeral or persistent based on predefined criteria. The security framework component 1118 may be configured as or otherwise support a means for configuring, by the server, a zero-trust security framework to govern data access and interactions among participants and the decentralized data plane. The blueprint deployment component 1120 may be configured as or otherwise support a means for deploying, by the server, the modular configuration blueprint to a designated network endpoint for execution.

The output module 1108 may manage output signals for the apparatus 1102. For example, the output module 1108 may receive signals from other components of the apparatus 1102, such as the modular configuration management component 1106, and may transmit these signals to other components or devices. In some specific examples, the output module 1108 may transmit output signals for display in a user interface, for storage in a database or data store, for further processing at a server or server cluster, or for any other processes at any number of devices or systems. In some cases, the output module 1108 may be a component of an I/O controller 1306 as described with reference to FIG. 13.

Figure 12:
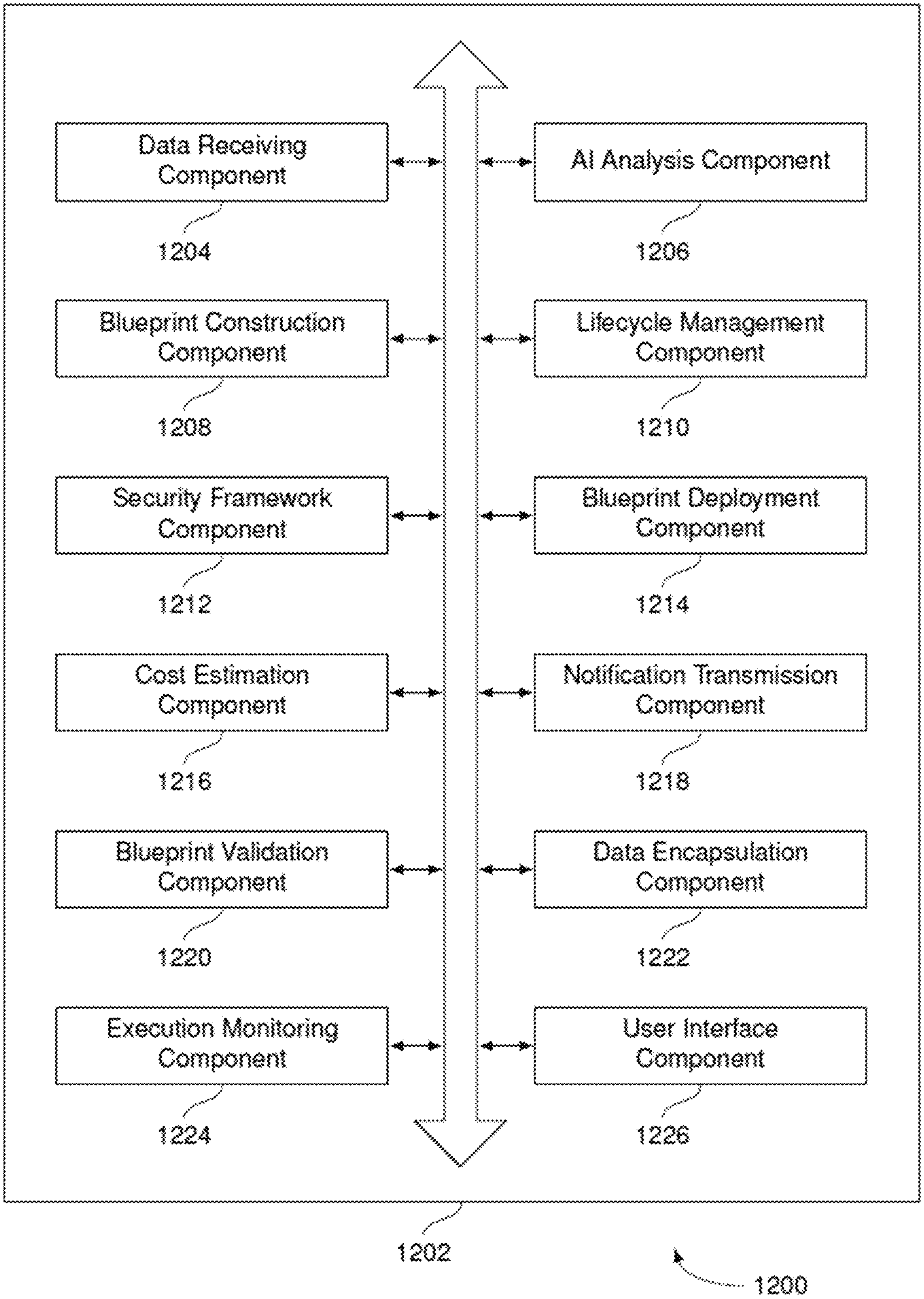
FIG. 12 shows a block diagram of a modular configuration management component that supports assembling tailored emergency response solutions with AI-driven modular architecture and a decentralized data plane in accordance with various aspects of the present disclosure.

FIG. 12 shows a block diagram 1200 of a modular configuration management component 1202 that supports assembling tailored emergency response solutions with AI-driven modular architecture and decentralized data plane in accordance with various aspects of the present disclosure. The modular configuration management component 1202 may be an example of aspects of a modular configuration management component 1106, a modular configuration management component 1304, or both, as described herein. The modular configuration management component 1202, or various components thereof, may be an example of means for performing various aspects of assembling tailored emergency response solutions with AI-driven modular architecture and decentralized data plane as described herein. For example, the modular configuration management component 1202 may include one or more of a data receiving component 1204, an AI analysis component 1206, a blueprint construction component 1208, a lifecycle management component 1210, a security framework component 1212, a blueprint deployment component 1214, a cost estimation component 1216, a notification transmission component 1218, a blueprint validation component 1220, a data encapsulation component 1222, an execution monitoring component 1224, a user interface component 1226, and/or other components. Each of these components may communicate, directly or indirectly, with one another (e.g., via one or more buses).

The data receiving component 1204 may be configured as or otherwise support a means for receiving operational input data that may define emergency response requirements for an entity at a server. In some implementations, the data receiving component 1204 may receive operational input data in the form of natural language descriptions provided by users through a web-based interface. The data receiving component 1204 may interpret these descriptions to determine specific emergency response needs, such as resource allocation or procedural adherence. The data receiving component 1204 may further support the ingestion of structured data, such as predefined templates or forms, that may outline the operational parameters for emergency scenarios. In some implementations, the data receiving component 1204 may process multimedia input, including audio or video streams, to extract relevant operational data for emergency response planning. The data receiving component 1204 may be capable of handling data from multiple sources simultaneously, such as sensors, devices, or human operators, to ensure comprehensive input coverage.

The AI analysis component 1206 may be configured as or otherwise support a means for analyzing the operational input data using a generative AI model to calculate a required solution shape and identifying a plurality of atomic software tools from a tool library to fulfill the required solution shape, each atomic software tool may be associated with a semantic interface layer specifying its functional attributes and data dependencies. In some implementations, the AI analysis component 1206 may determine the required solution shape by plotting operational needs across multiple axes, such as collaboration, contextualization, and decision support. The AI analysis component 1206 may determine the suitability of atomic software tools by matching their semantic interface layers to the operational requirements defined in the solution shape. In some implementations, the semantic interface layer of an atomic software tool may include machine-readable design files, such as Figma representations, to describe how the tool may be visually rendered within a user interface. The AI analysis component 1206 may determine resource usage patterns for the selected atomic software tools, such as computational or storage requirements, to estimate the resource consumption profile of the assembled solution.

The blueprint construction component 1208 may be configured as or otherwise support a means for constructing a modular configuration blueprint that may specify logical relationships among the identified atomic software tools and their integration with a decentralized data plane. In some implementations, the blueprint construction component 1208 may determine logical relationships by referencing predefined templates that may outline common interaction patterns between atomic software tools. In some implementations, the blueprint construction component 1208 may incorporate dependency mappings that may specify how data flows between tools within the decentralized data plane. In some implementations, the blueprint construction component 1208 may include mechanisms to define conditional logic that may govern the activation or deactivation of specific tools based on operational input data. In some implementations, the blueprint construction component 1208 may support the inclusion of metadata tags that may describe the roles or capabilities of the tools within the modular configuration blueprint. In some implementations, the blueprint construction component 1208 may allow for the specification of geospatial constraints that may influence the deployment of tools within the decentralized data plane.

The lifecycle management component 1210 may be configured as or otherwise support a means for establishing a data lifecycle management protocol within the decentralized data plane to classify and manage information as ephemeral or persistent based on predefined criteria. In some implementations, the lifecycle management component 1210 may classify information as ephemeral if it pertains to real-time data streams, such as live video feeds or telemetry, which may not require long-term storage. In some implementations, the lifecycle management component 1210 may classify information as persistent if it includes critical records, such as incident timelines or intelligence summaries, that may need to be retained for audit or compliance purposes. In some implementations, the lifecycle management component 1210 may determine the classification of information by referencing metadata tags that may describe the content type, source, or intended use of the data. In some implementations, the lifecycle management component 1210 may incorporate geospatial constraints to determine whether specific data should be retained or discarded based on the geographic relevance of the information. In some implementations, the lifecycle management component 1210 may support the application of temporal rules, such as retaining data for a predefined duration before transitioning it to an ephemeral state.

The security framework component 1212 may be configured as or otherwise support a means for configuring a zero-trust security framework to govern data access and interactions among participants and the decentralized data plane. In some implementations, the security framework component 1212 may determine access permissions by referencing a participant's authorization profile stored within the decentralized data plane. In some implementations, the security framework component 1212 may enforce data access rules by validating credential tokens associated with each participant's request. In some implementations, the security framework component 1212 may support the use of geospatial constraints to restrict data access based on the geographic location of the requesting participant. In some implementations, the security framework component 1212 may classify participants into predefined roles, such as responders or observers, to determine their level of access to specific data types. In some implementations, the security framework component 1212 may incorporate temporal rules to limit access to data based on the time of the request relative to the data's creation timestamp.

According to one embodiment, the Zero-Trust Security Framework may serve as a "Bouncer" subsystem within the Safety Network that checks permissions before every operation. In this capacity, the framework functions as a mandatory gatekeeper for all data plane interactions, ensuring that every action (whether it be registering a participant, posting to the ledger, searching historical records, or subscribing to a data stream) is cryptographically validated against a dynamic policy engine prior to execution.

This Bouncer subsystem may enforce permissions based on temporal validity (e.g., granting access only during an active shift), contextual scope (e.g., restricting data access to a specific incident geofence or activity ID), and capability assignments. By evaluating these rules at the ingress point of every operation, the system ensures that unauthorized entities cannot query the registry or append noise to the immutable ledger, thereby maintaining the integrity of the coordination record The blueprint deployment component 1214 may be configured as or otherwise support a means for deploying the modular configuration blueprint to a designated network endpoint for execution. In some implementations, the blueprint deployment component 1214 may deploy the modular configuration blueprint to a cloud-based server that may host the decentralized data plane. In some implementations, the blueprint deployment component 1214 may deploy the modular configuration blueprint to an on-premises server that may be managed by the customer organization. In some implementations, the blueprint deployment component 1214 may deploy the modular configuration blueprint to a hybrid environment that may combine cloud-based and on-premises resources.

In some examples, the cost estimation component 1216 may be configured as or otherwise support a means for calculating a predicted cost estimation profile for the modular configuration blueprint by aggregating AI token consumption, computational load, and storage requirements that may be defined within the semantic interface layer of each identified atomic software tool. In some implementations, the cost estimation component 1216 may determine the predicted cost estimation profile by referencing predefined usage patterns for AI models, such as the frequency of token generation during real-time data analysis. In some implementations, the cost estimation component 1216 may determine computational load by analyzing the processing requirements of atomic software tools when handling large-scale data streams, such as live video feeds or telemetry. In some implementations, the cost estimation component 1216 may determine storage requirements by evaluating the retention duration and metadata tags associated with persistent data, such as incident timelines or intelligence summaries.

In some examples, the notification transmission component 1218 may be configured as or otherwise support a means for transmitting a notification by publishing a standardized post object to a broker service within the decentralized data plane, wherein the broker service may distribute the post object to subscribing participants affected by the change in the modular configuration blueprint. In some implementations, the standardized post object may include metadata tags that may describe the type of change and its relevance to specific participants. In some implementations, the broker service may determine the appropriate participants to notify by referencing subscription criteria stored within the decentralized data plane. In some implementations, the notification transmission component 1218 may support the inclusion of geospatial constraints within the post object to limit notifications to participants within a defined geographic area. In some implementations, the broker service may distribute the post object in real-time to participants actively engaged in the relevant activity or incident.

In some examples, the blueprint validation component 1220 may be configured as or otherwise support a means for validating the modular configuration blueprint by instantiating a simulated network environment that may be populated by autonomous AI agents and executing a set of test prompts that may be defined within the semantic interface layers to verify functional interoperability. In some implementations, the simulated network environment may include virtual participants, such as drones or ambulances, that may interact with the modular configuration blueprint to test specific operational scenarios. In some implementations, the test prompts may include predefined sequences of actions, such as initiating a resource request or processing a live video feed, to determine whether the modular configuration blueprint supports seamless data exchange among the atomic software tools. In some implementations, the blueprint validation component 1220 may simulate geospatial constraints within the network environment to determine whether the modular configuration blueprint adheres to location-based operational requirements.

In some examples, the data encapsulation component 1222 may be configured as or otherwise support a means for managing information by encapsulating data within immutable post objects, and assigning priority levels by populating metadata fields within the post objects defined for significance and urgency to govern routing logic within the decentralized data plane. In some implementations, the data encapsulation component 1222 may encapsulate geospatial data within the immutable post objects to define location-specific parameters for routing. In some implementations, the data encapsulation component 1222 may assign priority levels by referencing predefined urgency thresholds stored in a configuration registry to align with operational requirements. In some implementations, the data encapsulation component 1222 may populate metadata fields with temporal attributes, such as timestamps, to influence the sequence of data processing within the decentralized data plane.

In some examples, the execution monitoring component 1224 may be configured as or otherwise support a means for monitoring the execution by utilizing a data plane connector embedded within each atomic software tool to automatically log operational exhaust and outcome metrics to a shared ledger within the decentralized data plane. In some implementations, the execution monitoring component 1224 may determine the frequency of logging operational exhaust by referencing predefined intervals stored in a configuration registry. In some implementations, the execution monitoring component 1224 may encapsulate outcome metrics within immutable post objects to ensure traceability within the shared ledger. In some implementations, the execution monitoring component 1224 may assign metadata tags to logged metrics, such as timestamps or participant identifiers, to support chronological organization of data entries. In some implementations, the execution monitoring component 1224 may classify logged metrics based on their significance or urgency to influence their prioritization within the shared ledger. In some implementations, the execution monitoring component 1224 may support geospatial tagging of logged metrics to associate operational data with specific geographic locations.

In some examples, the user interface component 1226 may be configured as or otherwise support a means for interpreting non-executable visual design specifications within the semantic interface layer to generate a user interface layout during the construction of the modular configuration blueprint via the generative AI model. In some implementations, the user interface component 1226 may interpret visual design specifications that include predefined color schemes and typography settings to align with organizational branding. In some implementations, the user interface component 1226 may determine layout constraints, such as grid structures or spacing guidelines, to ensure consistent visual alignment across different modules. In some implementations, the user interface component 1226 may interpret annotations within the semantic interface layer to identify interactive elements, such as buttons or sliders, and their corresponding behaviors.

Figure 13:
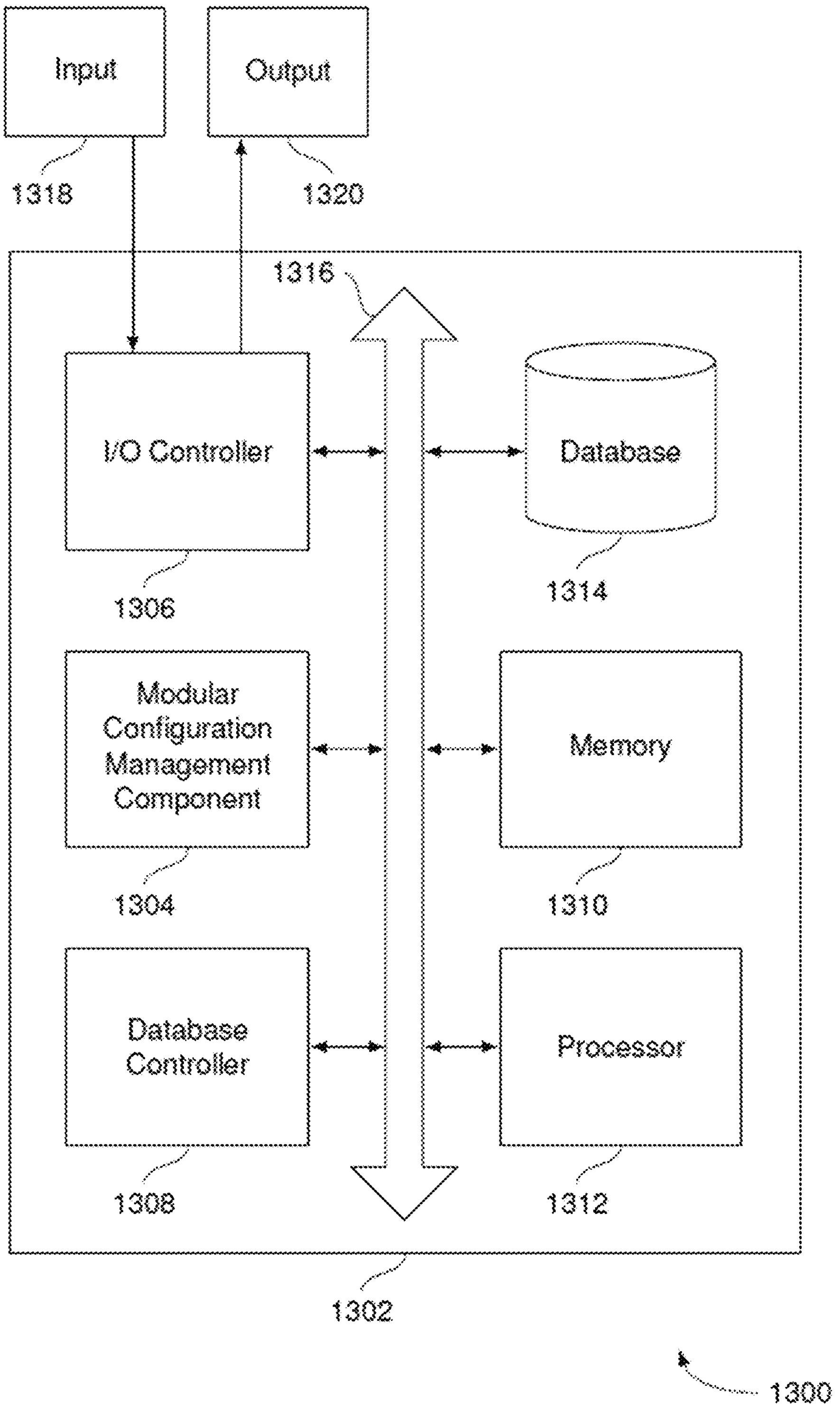
FIG. 13 shows a diagram of a system including a device that supports assembling tailored emergency response solutions with AI-driven modular architecture and a decentralized data plane in accordance with various aspects of the present disclosure.

FIG. 13 shows a diagram of a system 1300 including a device 1302 that supports assembling tailored emergency response solutions with AI-driven modular architecture and decentralized data plane in accordance with aspects of the present disclosure. The device 1302 may be an example of or include the components of a database server or an apparatus 1102 as described herein. The device 1302 may include components for bi-directional data communications including components for transmitting and receiving communications, including a modular configuration management component 1304, an I/O controller 1306, a database controller 1308, memory 1310, a processor 1312, and a database 1314. These components may be in electronic communication via one or more buses (e.g., bus 1316).

The modular configuration management component 1304 may be an example of a modular configuration management component 1106 or 1202 as described herein. For example, the modular configuration management component 1304 may perform any of the methods or processes described above with reference to FIGS. 11 and 12. In some cases, the modular configuration management component 1304 may be implemented in hardware, software executed by a processor, firmware, or any combination thereof.

The I/O controller 1306 may manage input signals 1318 and output signals 1320 for the device 1302. The I/O controller 1306 may also manage peripherals not integrated into the device 1302. In some cases, the I/O controller 1306 may represent a physical connection or port to an external peripheral. In some cases, the I/O controller 1306 may utilize an operating system such as iOS®, ANDROID®, MS-DOS®, MS-WINDOWS®, OS/2®, UNIX®, LINUX®, or another known operating system. In other cases, the I/O controller 1306 may represent or interact with a modem, a keyboard, a mouse, a touchscreen, or a similar device. In some cases, the I/O controller 1306 may be implemented as part of a processor. In some cases, a user may interact with the device 1302 via the I/O controller 1306 or via hardware components controlled by the I/O controller 1306.

The database controller 1308 may manage data storage and processing in a database 1314. In some cases, a user may interact with the database controller 1308. In other cases, the database controller 1308 may operate automatically without user interaction. The database 1314 may be an example of a single database, a distributed database, multiple distributed databases, a data store, a data lake, or an emergency backup database.

Memory 1310 may include random-access memory (RAM) and read-only memory (ROM). The memory 1310 may store computer-readable, computer-executable software including instructions that, when executed, cause the processor to perform various functions described herein. In some cases, the memory 1310 may contain, among other things, a basic input/output system (BIOS) which may control basic hardware or software operation such as the interaction with peripheral components or devices.

The processor 1312 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1312 may be configured to operate a memory array using a memory controller. In other cases, a memory controller may be integrated into the processor 1312. The processor 1312 may be configured to execute computer-readable instructions stored in a memory 1310 to perform various functions (e.g., functions or tasks supporting assembling tailored emergency response solutions with AI-driven modular architecture and decentralized data plane).

Figure 14:
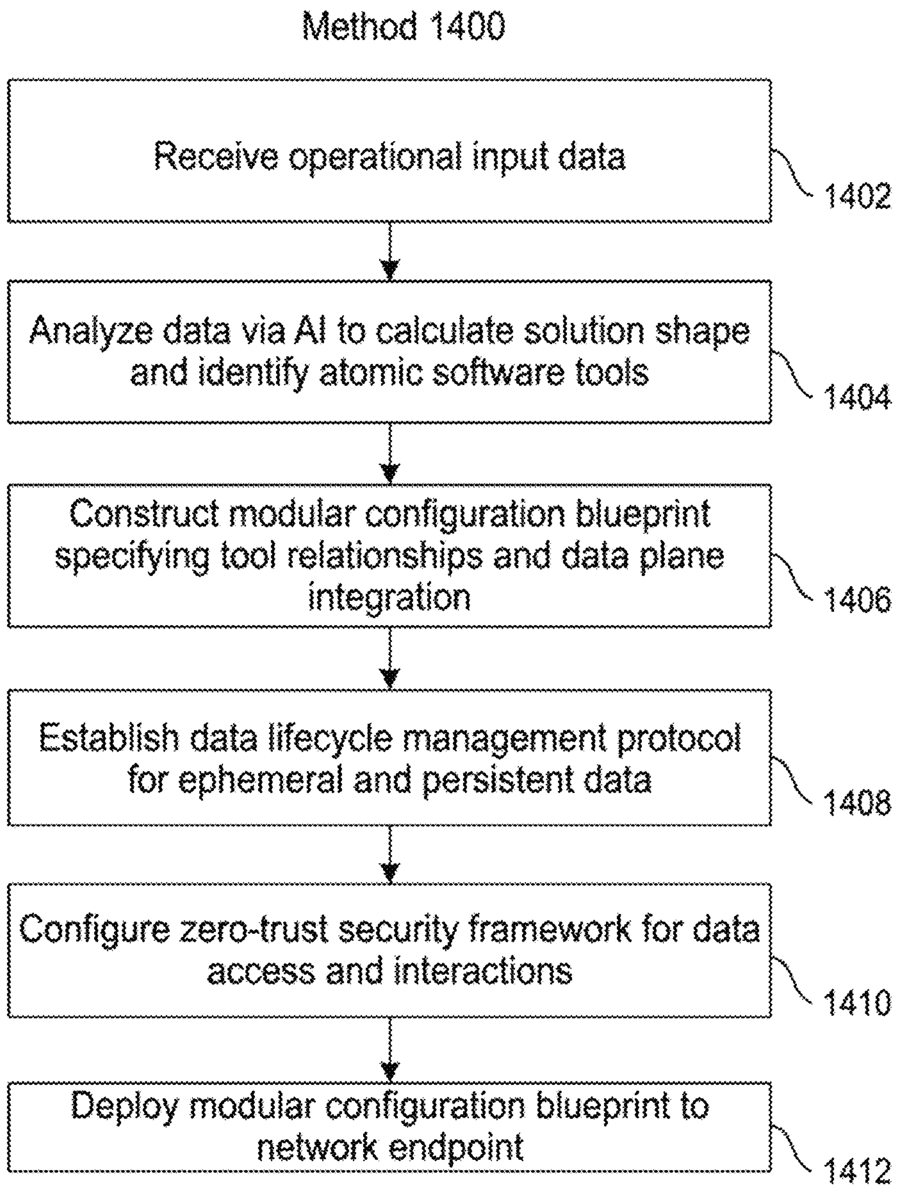
FIGS. 14 and 15 show flowcharts illustrating methods that support assembling tailored emergency response solutions with AI-driven modular architecture and a decentralized data plane in accordance with various aspects of the present disclosure.

FIG. 14 shows a flowchart illustrating a method 1400 that supports assembling tailored emergency response solutions with AI-driven modular architecture and decentralized data plane in accordance with various aspects of the present disclosure. The operations of the method 1400 may be implemented by one or more components of a networked computing system as described herein. For example, the operations of the method 1400 may be performed by a modular configuration management component as described with reference to FIGS. 11 through 13. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 1402, the method 1400 may include receiving, at a server, operational input data defining emergency response requirements for an entity. The operations of 1402 may be performed in accordance with examples as disclosed herein. In some examples, aspects of the operations of 1402 may be performed by a data receiving component 1204 as described with reference to FIG. 12.

At 1404, the method 1400 may include analyzing, by a generative artificial intelligence (AI) model, the operational input data to calculate a required solution shape and identifying a plurality of atomic software tools from a tool library to fulfill the required solution shape, each atomic software tool associated with a semantic interface layer specifying its functional attributes and data dependencies. The operations of 1404 may be performed in accordance with examples as disclosed herein. In some examples, aspects of the operations of 1404 may be performed by an AI analysis component 1206 as described with reference to FIG. 12.

At 1406, the method 1400 may include constructing, by the server, a modular configuration blueprint that specifies logical relationships among the identified atomic software tools and their integration with a decentralized data plane. The operations of 1406 may be performed in accordance with examples as disclosed herein. In some examples, aspects of the operations of 1406 may be performed by a blueprint construction component 1208 as described with reference to FIG. 12.

At 1408, the method 1400 may include establishing, by the server, a data lifecycle management protocol within the decentralized data plane to classify and manage information as ephemeral or persistent based on predefined criteria. The operations of 1408 may be performed in accordance with examples as disclosed herein. In some examples, aspects of the operations of 1408 may be performed by a lifecycle management component 1210 as described with reference to FIG. 12.

At 1410, the method 1400 may include configuring, by the server, a zero-trust security framework to govern data access and interactions among participants and the decentralized data plane. The operations of 1410 may be performed in accordance with examples as disclosed herein. In some examples, aspects of the operations of 1410 may be performed by a security framework component 1212 as described with reference to FIG. 12.

At 1412, the method 1400 may include deploying, by the server, the modular configuration blueprint to a designated network endpoint for execution. The operations of 1412 may be performed in accordance with examples as disclosed herein. In some examples, aspects of the operations of 1412 may be performed by a blueprint deployment component 1214 as described with reference to FIG. 12.

Figure 15:
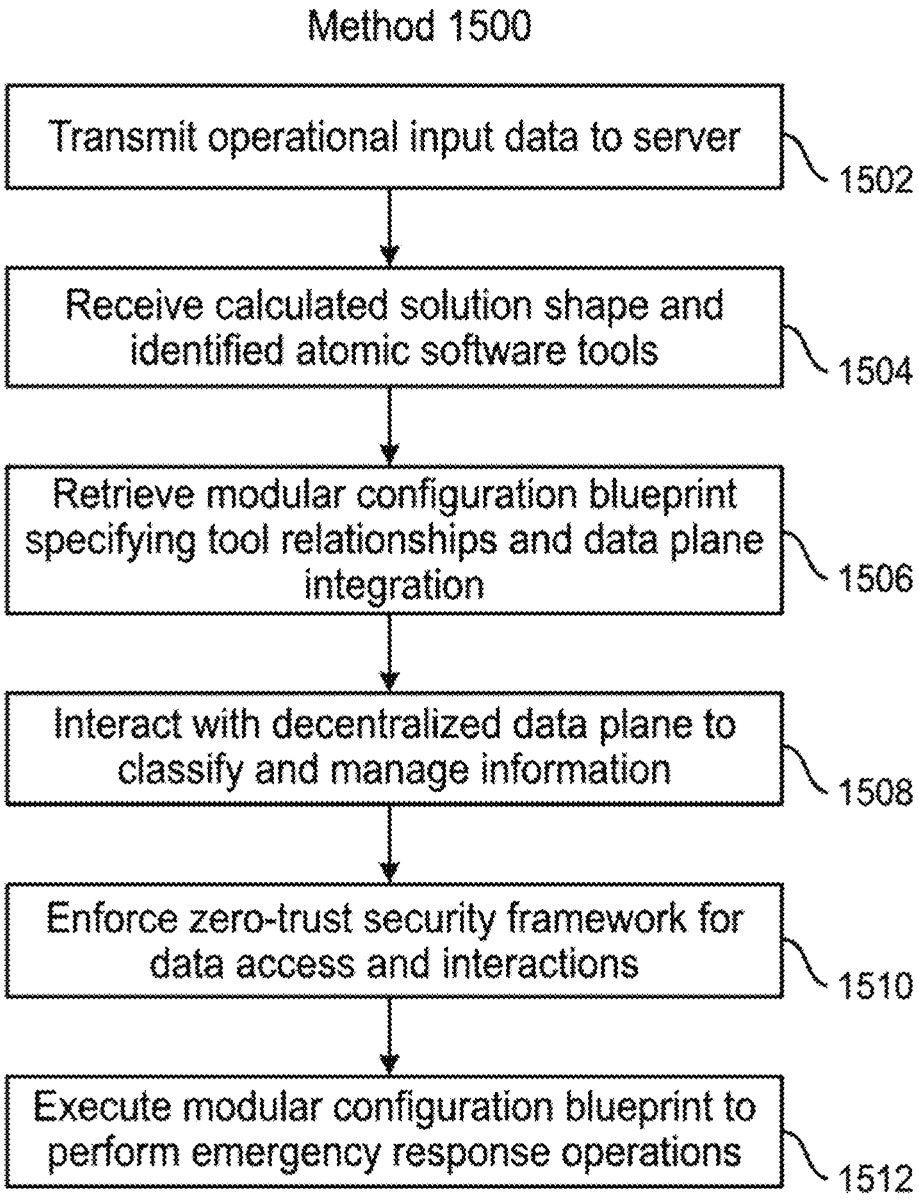

FIG. 15 shows a flowchart illustrating a method 1500 that supports assembling tailored emergency response solutions with AI-driven modular architecture and decentralized data plane in accordance with various aspects of the present disclosure. The operations of the method 1500 may be implemented by one or more components of a networked computing system as described herein. For example, the operations of the method 1500 may be performed by a modular configuration management component as described with reference to FIGS. 11 through 13. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 1502, the method 1500 may include transmitting, by a user device, operational input data defining emergency response requirements for an entity to a server. The operations of 1502 may be performed in accordance with examples as disclosed herein. In some examples, aspects of the operations of 1502 may be performed by a data receiving component 1204 as described with reference to FIG. 12.

At 1504, the method 1500 may include receiving, from the server, a calculated solution shape and a plurality of identified atomic software tools from a tool library, each atomic software tool associated with a semantic interface layer specifying its functional attributes and data dependencies. The operations of 1504 may be performed in accordance with examples as disclosed herein. In some examples, aspects of the operations of 1504 may be performed by an AI analysis component 1206 as described with reference to FIG. 12.

At 1506, the method 1500 may include retrieving, by the user device, a modular configuration blueprint from the server, the blueprint specifying logical relationships among the identified atomic software tools and their integration with a decentralized data plane. The operations of 1506 may be performed in accordance with examples as disclosed herein. In some examples, aspects of the operations of 1506 may be performed by a blueprint construction component 1208 as described with reference to FIG. 12.

At 1508, the method 1500 may include interacting, by the user device, with the decentralized data plane to classify and manage information as ephemeral or persistent based on predefined criteria established by a data lifecycle management protocol. The operations of 1508 may be performed in accordance with examples as disclosed herein. In some examples, aspects of the operations of 1508 may be performed by a lifecycle management component 1210 as described with reference to FIG. 12.

At 1510, the method 1500 may include enforcing, by the user device, a zero-trust security framework to govern data access and interactions with the decentralized data plane and other participants. The operations of 1510 may be performed in accordance with examples as disclosed herein. In some examples, aspects of the operations of 1510 may be performed by a security framework component 1212 as described with reference to FIG. 12.

At 1512, the method 1500 may include executing, by the user device, the modular configuration blueprint to perform emergency response operations. The operations of 1512 may be performed in accordance with examples as disclosed herein. In some examples, aspects of the operations of 1512 may be performed by a blueprint deployment component 1214 as described with reference to FIG. 12.

Figure 16:
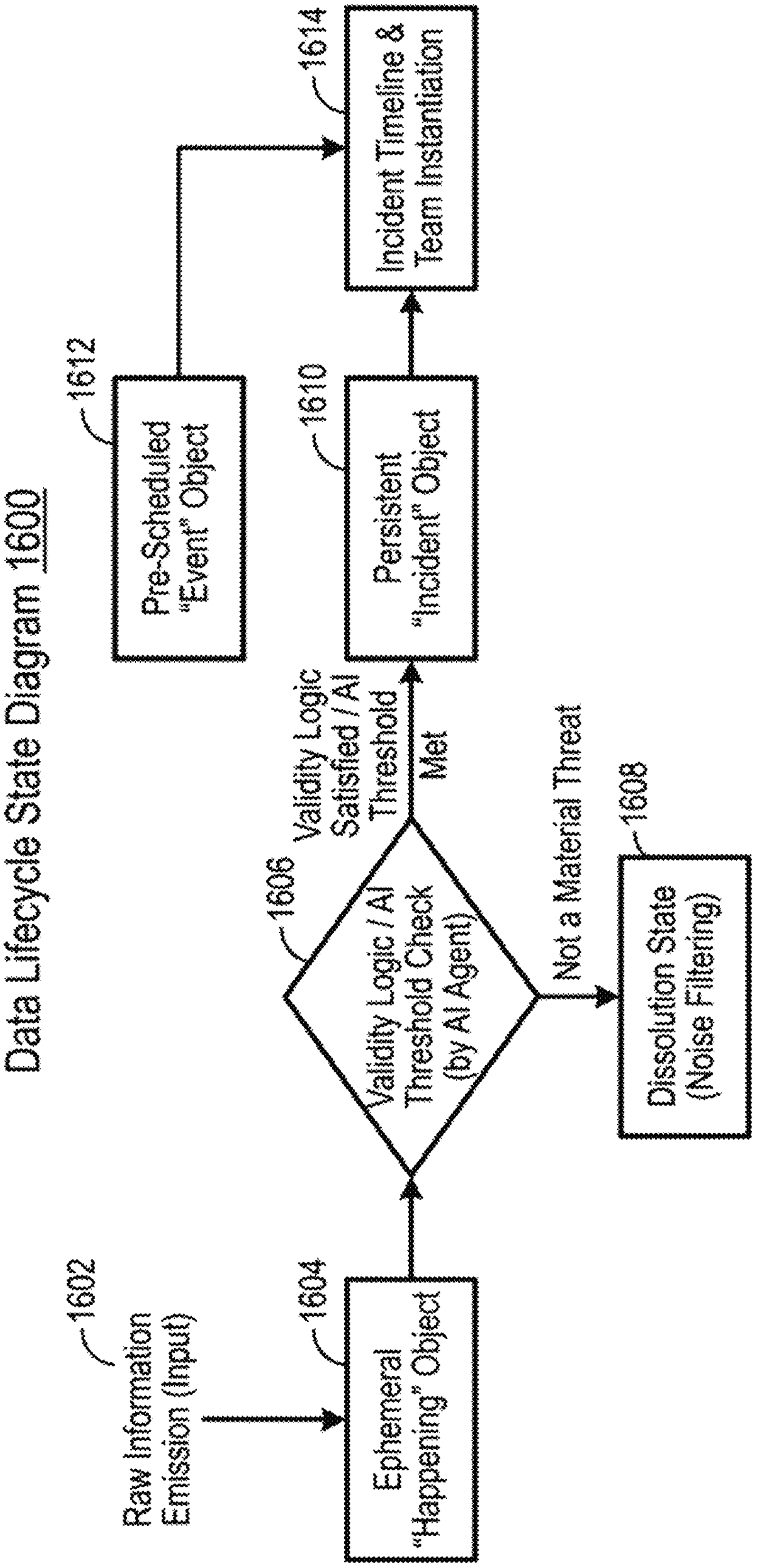
FIG. 16 illustrates a data lifecycle state machine utilized by the decentralized data plane to manage information verification and noise reduction in accordance with various aspects of the present disclosure.

FIG. 16 illustrates a data lifecycle state machine 1600 utilized by the decentralized data plane to manage information verification and noise reduction in accordance with various aspects of the present disclosure. As depicted in FIG. 16, the data lifecycle state machine 1600 may include: Raw Information Emission 1602; Ephemeral "Happening" Object 1604; Validity Logic/AI Threshold Check 1606; Dissolution State 1608; Persistent "Incident" Object 1610; Pre-Scheduled "Event" Object 1612; Incident Timeline & Team Instantiation 1614; and/or other components.

The data lifecycle state machine 1600 governs the promotion of data within the safety network. It begins with a raw information emission 1602, generated by a sensor, device, or human participant (e.g., a smoke detector activation or a textual report). Upon receipt, the data plane instantiates an ephemeral "happening" object 1604. This object is transient and does not yet trigger a full network response.

The happening object 1604 is subjected to validity logic or an AI threshold check 1606. This check is performed by an autonomous AI agent (e.g., a Shared AI Participant) which evaluates the happening against confidence scores, corroborating data streams, or urgency attributes.

If the validity logic 1606 determines that the emission does not constitute a material threat (e.g., a false alarm), the happening transitions to the dissolution state 1608. In this state, the object is deprecated or removed without alerting human operators, thereby filtering operational noise.

If the validity logic 1606 is satisfied, the happening is promoted to a persistent "incident" object 1610. This promotion triggers the creation of an incident timeline and team instantiation 1614, where specific Participants are invited to respond. Alternatively, the system may ingest a pre-scheduled "event" object 1612 (e.g., a planned public gathering), which bypasses the happening state and directly instantiates a timeline for future resource planning.

Figure 17:
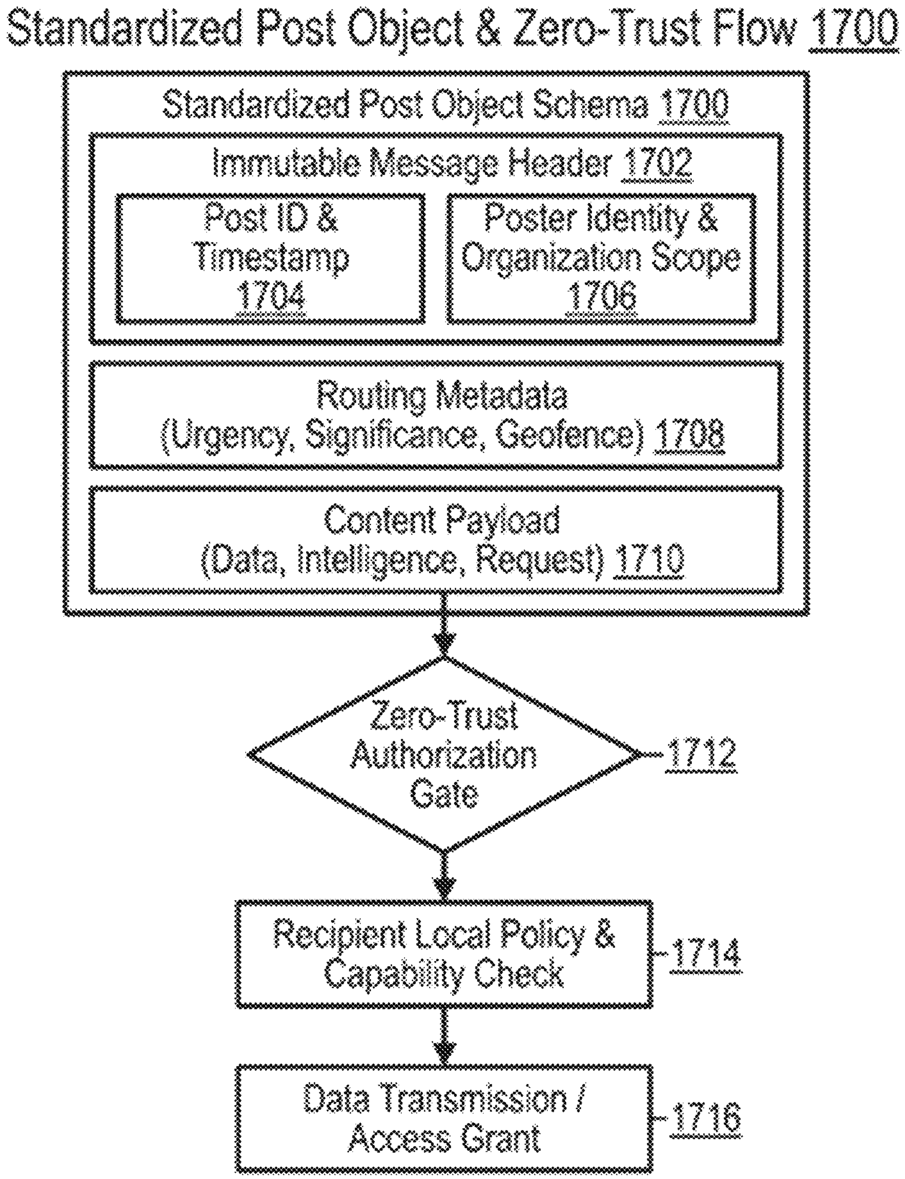
FIG. 17 illustrates the structure of a standardized post object and the associated zero-trust authorization flow utilized for secure information exchange in accordance with various aspects of the present disclosure.

FIG. 17 illustrates the structure of a standardized post object and the associated zero-trust authorization flow 1700 utilized for secure information exchange in accordance with various aspects of the present disclosure. As depicted in FIG. 17, the schema may include: Immutable Message Header 1702; Post ID & Timestamp 1704; Poster Identity & Organization Scope 1706; Routing Metadata 1708; Content Payload 1710; Zero-Trust Authorization Gate 1712; Recipient Local Policy & Capability Check 1714; Data Transmission/Access Grant 1716; and/or other components.

The zero-trust authorization flow 1700 represents the fundamental unit of communication on the data plane. It comprises an immutable message header 1702 containing a unique post ID and timestamp 1704 for auditability. Crucially, the header includes the poster identity and organization scope 1706, which cryptographically identifies the origin of the message (e.g., "Drone-51" from "Police Dept A").

The post includes routing metadata 1708, such as urgency levels, significance scores, and geofence tags, which allow the data plane's Broker service to efficiently distribute the message to subscribers. The content payload 1710 encapsulates the actual information, which may vary in type including raw Data, processed Intelligence, or a service Request.

FIG. 17 further illustrates the zero-trust authorization gate 1712. When a recipient participant receives a Post (specifically a Request), it does not rely on a central server for permission. Instead, the recipient performs a recipient local policy & capability check 1714. The recipient evaluates the Poster Identity 1706 against its own internal configuration file to determine if the requester is authorized. Only upon successful local validation does the recipient execute the data transmission or access grant 1716, ensuring the network remains secure even if individual nodes are compromised.

It should be noted that the methods described herein describe possible implementations, and that the operations and the steps may be rearranged or otherwise modified and that other implementations are possible. Furthermore, aspects from two or more of the methods may be combined.

Aspect 1: A method for dynamically assembling modular emergency response solutions with a decentralized data plane, comprising: receiving, at a server, operational input data defining emergency response requirements for an entity; analyzing, by a generative artificial intelligence (AI) model, the operational input data to calculate a required solution shape and identifying a plurality of atomic software tools from a tool library to fulfill the required solution shape, each atomic software tool associated with a semantic interface layer specifying its functional attributes and data dependencies; constructing, by the server, a modular configuration blueprint that specifies logical relationships among the identified atomic software tools and their integration with a decentralized data plane; establishing, by the server, a data lifecycle management protocol within the decentralized data plane to classify and manage information as ephemeral or persistent based on predefined criteria; configuring, by the server, a zero-trust security framework to govern data access and interactions among participants and the decentralized data plane; and deploying, by the server, the modular configuration blueprint to a designated network endpoint for execution.

Aspect 2: The method of aspect 1, further comprising calculating, by the server, a predicted cost estimation profile for the modular configuration blueprint by aggregating AI token consumption, computational load, and storage requirements defined within the semantic interface layer of each identified atomic software tool.

Aspect 3: The method of any of aspects 1 through 2, wherein transmitting a notification comprises publishing a standardized post object to a broker service within the decentralized data plane, wherein the broker service distributes the post object to subscribing participants affected by the change in the modular configuration blueprint.

Aspect 4: The method of any of aspects 1 through 3, further comprising validating the modular configuration blueprint by instantiating a simulated network environment populated by autonomous AI agents and executing a set of test prompts defined within the semantic interface layers to verify functional interoperability.

Aspect 5: The method of any of aspects 1 through 4, wherein managing information comprises encapsulating data within immutable post objects, and wherein assigning priority levels comprises populating metadata fields within the post objects defined for significance and urgency to govern routing logic within the decentralized data plane.

Aspect 6: The method of any of aspects 1 through 5, wherein monitoring the execution comprises utilizing a data plane connector embedded within each atomic software tool to automatically log operational exhaust and outcome metrics to a shared ledger within the decentralized data plane.

Aspect 7: The method of any of aspects 1 through 6, wherein the semantic interface layer comprises non-executable visual design specifications, and wherein constructing the blueprint comprises generating a user interface layout by interpreting the visual design specifications via the generative AI model.

Aspect 8: The method of any of aspects 1 through 7, wherein the data lifecycle management protocol is configured to instantiate incoming data emissions as ephemeral 'happening' objects and promote them to persistent 'incident' objects only upon satisfying a validity threshold determined by the generative AI model.

Aspect 9: The method of any of aspects 1 through 8, wherein the modular configuration blueprint specifies a hierarchical arrangement of atomic software tools, with dependencies among the tools defined by their respective semantic interface layers.

Aspect 10: The method of any of aspects 1 through 9, wherein the zero-trust security framework enforces access control policies by dynamically verifying participant credentials against a registry of authorized roles and capabilities.

Aspect 11: The method of any of aspects 1 through 10, wherein the decentralized data plane includes a stream hub configured to manage real-time data streams, and wherein the modular configuration blueprint incorporates stream subscriptions for participants requiring continuous data updates.

Aspect 12: The method of any of aspects 1 through 11, wherein the operational input data includes geospatial parameters, and wherein the modular configuration blueprint incorporates geofencing logic to restrict data access and tool functionality based on the specified geospatial parameters.

Aspect 13: A system for dynamically assembling modular emergency response solutions with a decentralized data plane, comprising a processor; memory coupled with the processor; and instructions stored in the memory and executable by the processor to cause the system to perform a method of any of aspects 1 through 12.

Aspect 14: A system for dynamically assembling modular emergency response solutions with a decentralized data plane, comprising at least one means for performing a method of any of aspects 1 through 12.

Aspect 15: A non-transitory computer-readable medium storing code for dynamically assembling modular emergency response solutions with a decentralized data plane, the code comprising instructions executable by a processor to perform a method of any of aspects 1 through 12.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for dynamically assembling modular emergency response solutions with a decentralized data plane, comprising:

receiving, at a server, operational input data defining emergency response requirements for an entity;

analyzing, by a generative artificial intelligence (AI) model, the operational input data to calculate a required solution shape and identifying a plurality of atomic software tools from a tool library to fulfill the required solution shape, each atomic software tool associated with a semantic interface layer specifying its functional attributes and data dependencies;

constructing, by the server, a modular configuration blueprint that specifies logical relationships among the plurality of atomic software tools and their integration with the decentralized data plane;

establishing, by the server, a data lifecycle management protocol within the decentralized data plane to classify and manage information as ephemeral or persistent based on predefined criteria;

configuring, by the server, a zero-trust security framework to govern data access and interactions among participants and the decentralized data plane; and deploying, by the server, the modular configuration blueprint to a designated network endpoint for execution.

2. The method of claim 1, further comprising calculating, by the server, a predicted cost estimation profile for the modular configuration blueprint by aggregating AI token consumption, computational load, and storage requirements defined within the semantic interface layer of each atomic software tool.

3. The method of claim 1, wherein transmitting a notification comprises publishing a standardized post object to a broker service within the decentralized data plane, wherein the broker service distributes the standardized post object to the participants affected by a change in the modular configuration blueprint.

4. The method of claim 1, further comprising validating the modular configuration blueprint by instantiating a simulated network environment populated by autonomous AI agents and executing a set of test prompts defined within the semantic interface layer to verify functional interoperability.

5. The method of claim 1, wherein managing the information comprises encapsulating data within immutable post objects, and wherein assigning priority levels comprises populating metadata fields within the immutable post objects defined for significance and urgency to govern routing logic within the decentralized data plane.

6. The method of claim 1, wherein monitoring the execution comprises utilizing a data plane connector embedded within each atomic software tool to automatically log operational exhaust and outcome metrics to a shared ledger within the decentralized data plane.

7. The method of claim 1, wherein the semantic interface layer comprises non-executable visual design specifications, and wherein constructing the modular configuration blueprint comprises generating a user interface layout by interpreting the visual design specifications via the generative AI model.

8. The method of claim 1, wherein the data lifecycle management protocol is configured to instantiate incoming data emissions as ephemeral happening objects and promote them to persistent incident objects only upon satisfying a validity threshold determined by the generative AI model.

9. The method of claim 1, wherein the zero-trust security framework enforces access control policies by dynamically verifying participant credentials against a registry of authorized roles and capabilities.

10. The method of claim 1, wherein the decentralized data plane includes a stream hub configured to manage real-time data streams, and wherein the modular configuration blueprint incorporates stream subscriptions for the participants requiring continuous data updates.

11. The method of claim 1, wherein the operational input data includes geospatial parameters, and wherein the modular configuration blueprint incorporates geofencing logic to restrict data access and tool functionality based on the geospatial parameters.

12. A system configured for dynamically assembling modular emergency response solutions with a decentralized data plane, comprising:

a processor;

memory coupled with the processor; and instructions stored in the memory and executable by the processor to cause the system to:

receive operational input data defining emergency response requirements for an entity;

analyze, using a generative artificial intelligence (AI) model, the operational input data to calculate a required solution shape and identify a plurality of atomic software tools from a tool library to fulfill the required solution shape, each atomic software tool associated with a semantic interface layer specifying its functional attributes and data dependencies;

construct a modular configuration blueprint that specifies logical relationships among the plurality of atomic software tools and their integration with the decentralized data plane;

establish a data lifecycle management protocol within the decentralized data plane to classify and manage information as ephemeral or persistent based on predefined criteria;

configure a zero-trust security framework to govern data access and interactions among participants and the decentralized data plane; and deploy the modular configuration blueprint to a designated network endpoint for execution.

13. The system of claim 12, wherein the instructions further cause the system to calculate a predicted cost estimation profile for the modular configuration blueprint by aggregating AI token consumption, computational load, and storage requirements defined within the semantic interface layer of each atomic software tool.

14. The system of claim 12, wherein the instructions further cause the system to transmit a notification by publishing a standardized post object to a broker service within the decentralized data plane, wherein the broker service distributes the standardized post object to the participants affected by a change in the modular configuration blueprint.

15. The system of claim 12, wherein the instructions further cause the system to validate the modular configuration blueprint by instantiating a simulated network environment populated by autonomous AI agents and executing a set of test prompts defined within the semantic interface layer to verify functional interoperability.

16. The system of claim 12, wherein the instructions further cause the system to manage the information by encapsulating data within immutable post objects, and wherein assigning priority levels comprises populating metadata fields within the immutable post objects defined for significance and urgency to govern routing logic within the decentralized data plane.

17. The system of claim 12, wherein the instructions further cause the system to monitor the execution by utilizing a data plane connector embedded within each atomic software tool to automatically log operational exhaust and outcome metrics to a shared ledger within the decentralized data plane.

18. The system of claim 12, wherein the semantic interface layer comprises visual design specifications, and wherein the instructions are further executable by the processor to cause the system to construct the modular configuration blueprint by generating a user interface layout by interpreting the visual design specifications via the generative AI model.

19. The system of claim 12, wherein the instructions further cause the system to configure the data lifecycle management protocol to instantiate incoming data emissions as ephemeral happening objects and promote them to persistent incident objects only upon satisfying a validity threshold determined by the generative AI model.

20. A non-transitory computer-readable medium storing code for dynamically assembling modular emergency response solutions with a decentralized data plane, the code comprising instructions executable by a processor to:

receive operational input data defining emergency response requirements for an entity;

analyze the operational input data using a generative artificial intelligence (AI) model to calculate a required solution shape and identify a plurality of atomic software tools from a tool library to fulfill the required solution shape, each atomic software tool associated with a semantic interface layer specifying its functional attributes and data dependencies;

construct a modular configuration blueprint that specifies logical relationships among the plurality of atomic software tools and their integration with the decentralized data plane;

establish a data lifecycle management protocol within the decentralized data plane to classify and manage information as ephemeral or persistent based on predefined criteria;

configure a zero-trust security framework to govern data access and interactions among participants and the decentralized data plane; and deploy the modular configuration blueprint to a designated network endpoint for execution.

* * * * *